(12) United States Patent
Yoshimi et al.

(10) Patent No.: US 9,400,374 B2
(45) Date of Patent: Jul. 26, 2016

(54) ZOOM LENS AND IMAGE PICKUP APPARATUS INCLUDING THE SAME

(71) Applicant: CANON KABUSHIKI KAISHA, Tokyo (JP)

(72) Inventors: Takahiro Yoshimi, Utsunomiya (JP); Kazuya Shimomura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/161,865

(22) Filed: Jan. 23, 2014

(65) Prior Publication Data

US 2014/0204252 A1    Jul. 24, 2014

(30) Foreign Application Priority Data

Jan. 23, 2013   (JP) .................................. 2013-010124

(51) Int. Cl.
| | |
|---|---|
| *G02B 15/14* | (2006.01) |
| *G02B 15/173* | (2006.01) |
| *G02B 15/167* | (2006.01) |

(52) U.S. Cl.
CPC .............. *G02B 15/173* (2013.01); *G02B 15/14* (2013.01); *G02B 15/167* (2013.01)

(58) Field of Classification Search
CPC ........ G02B 15/00; G02B 15/14; G02B 15/15; G02B 15/16; G02B 15/163; G02B 15/167; G02B 15/173; G02B 15/20; G02B 15/24; G02B 15/28
See application file for complete search history.

(56) References Cited

U.S. PATENT DOCUMENTS

| | | | | |
|---|---|---|---|---|
| 4,830,477 A | * | 5/1989 | Takahashi ............ | G02B 15/173 359/683 |
| 2007/0223108 A1 | * | 9/2007 | Iijima .................. | G02B 15/173 359/692 |
| 2008/0030871 A1 | * | 2/2008 | Tejima ................. | G02B 15/177 359/676 |
| 2011/0134266 A1 | * | 6/2011 | Mihara .................. | G02B 13/18 348/222.1 |

FOREIGN PATENT DOCUMENTS

JP      H07-248449 A    9/1995

* cited by examiner

*Primary Examiner* — Thong Nguyen

(74) *Attorney, Agent, or Firm* — Carter, DeLuca, Farrell & Schmidt, LLP

(57) ABSTRACT

A zoom lens including, in order from an object side, positive, negative, positive, positive, and positive lens units, or positive, negative, positive, positive, positive, and positive lens units. $1.5<L2fm/L2W<500$; $-30<f3/f2<-3$; and $-15<f1/f23W<-8$ are satisfied, where $fm=fw\times(Z)^{1/2}$, fw represents a focal length of the entire system at a wide angle end, Z represents a zoom ratio, L2W represents an interval between a second and third lens units at the wide angle end, L2fm represents an interval between the second and third lens units at a zoom position at which an offaxial principal ray having a largest image height is highest farthest from an optical axis on a lens surface disposed on the most object side in the first lens unit in a zoom range from the wide angle end to the focal length fm, f1, f2 and f3 respectively represent focal lengths of the first, second, and third lens units, and f23W represents a combined focal length of the second and third lens unit at the wide angle end.

6 Claims, 12 Drawing Sheets

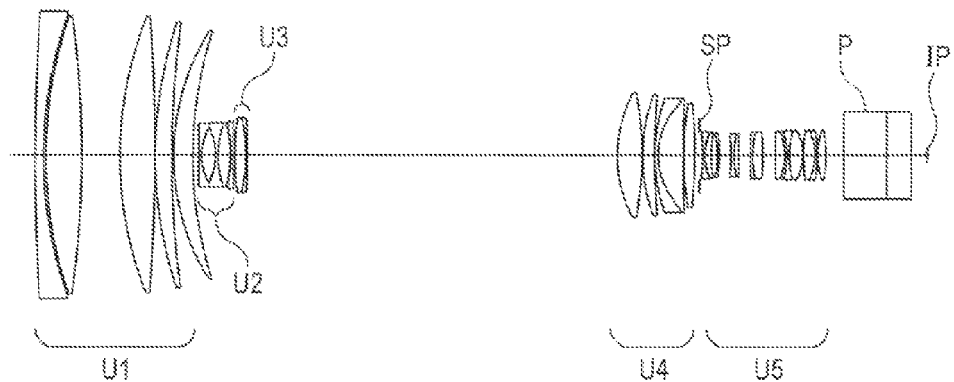
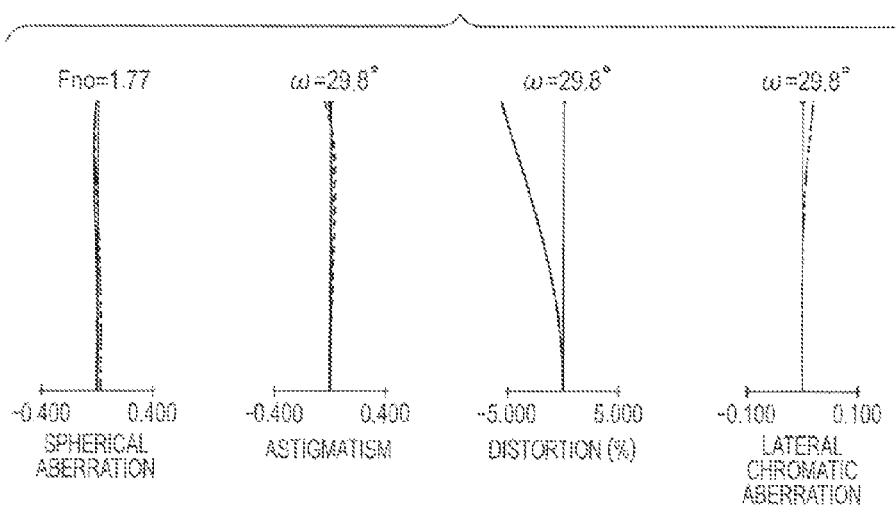

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the zoom lens, which are suitable for use in a broadcasting television camera, a video camera, a digital still camera, and a silver-halide film camera.

In recent years, a zoom lens having a wide angle of field and a high zoom ratio and further having high optical performance has been demanded for image pickup apparatus such as a television camera, a silver-halide film camera, a digital camera, and a video camera. As the zoom lens having the wide angle of field and the high zoom ratio, there has been known a positive-lead and telephoto type five-unit zoom lens including five lens units in which a lens unit having a positive refractive power is arranged at the end on an object side, and which include, as a whole, positive, negative, positive, positive, and positive lens units.

2. Description of the Related Art

For instance, as a zoom lens of this positive-lead type, there is known a five-unit zoom lens suitable for a television camera, in which a zoom lens unit having a variator function and a compensator function includes three movable lens units moving in different loci during zooming (Japanese Patent Application Laid-Open No. H07-248449).

Japanese Patent Application Laid-Open No. H07-248449 discloses a zoom lens having an angle of field at wide angle end of approximately 60° to 70° and a magnification of approximately 10 to 20, which includes a first lens unit having a positive refractive power, a second lens unit having a negative refractive power, a third lens unit having a positive refractive power, a fourth lens unit having a positive refractive power, and a fifth lens unit having a positive refractive power. In the structure disclosed in Japanese Patent Application Laid-Open No. H07-248449, the second, third, and fourth lens units constitute a zoom system.

An image pickup apparatus such as a television camera, a photographing camera, and a video camera is strongly required to have high optical performance with the entire system having a small size and a light weight. In particular, to a wide angle and super telephoto lens having an angle of field at wide angle end of 50° or larger and a magnification of 60 or larger, the size and weight of the first lens unit cause an increase in size and weight of the entire lens, which significantly affects operability of a camera lens. Therefore, downsizing and weight reduction of the first lens unit are particularly important.

In order to achieve both a wide angle of field and a high zoom ratio while suppressing an increase or an effective lens diameter of the first lens unit, it is important to appropriately achieve power arrangement of the constituting lens units and to appropriately set movement loci during zooming of the second and third lens units for zooming. In particular, it is important to appropriately set the movement loci in a zoom range from the wide angle end to an intermediate zoom position. When these configurations are not appropriately set, it is difficult to provide a zoom lens having high optical performance over the entire zoom range with a wide angle of field and a high zoom ratio while downsizing the entire system.

SUMMARY OF THE INVENTION

The present invention provides a zoom lens having a small size, a wide angle of field, and a high zoom ratio as well as high optical performance over the entire zoom range, and provides an image pickup apparatus including the zoom lens.

According to one embodiment of the present invention, there is provided a zoom lens including, in order from an object side to an image side, a first lens unit having a positive refractive power, which does not move for zooming, a second lens unit having a negative refractive power, which moves toward the image side during zooming from wide angle end to telephoto end, a third lens unit having a positive refractive power, which moves toward the image side during zooming from the wide angle end to the telephone end, a fourth lens unit having a positive refractive power, which moves toward the object side during zooming from wide angle end to telephoto end, and a fifth lens unit having a positive refractive power, which does not move for zooming, in which, when a focal length fm at an intermediate zoom position is expressed by $fm=fw\times(Z)^{1/2}$ where fw represents a focal length of the zoom lens at a wide angle end, and Z represents a zoom ratio, the following conditional expressions are satisfied:

$$1.5 < L2fm/L2W < 500;$$

$$-30 < f3/f2 < -3;$$

and $$-15 < f1/f23W < -8,$$

where L2W represents an interval between the second lens unit and the third lens unit at the wide angle end, L2fm represents an interval between the second lens unit and the third lens unit at a zoom position at which an offaxial principal ray having a largest image height is farthest from an optical axis on a lens surface disposed on the most object side in the first lens unit in a zoom range from the wide angle end to the focal length fm, f1 represents a focal length of the first lens unit, f2 represents a focal length of the second lens unit, f3 represents a focal length of the third lens unit, and f23W represents a combined focal length of the second lens unit and the third lens unit at the wide angle end.

Further, according to one embodiment of the present invention, there is provided a zoom lens including, in order from an object side to an image side, a first lens unit having a positive refractive power, which does not move for zooming from wide angle end to telephofo end, a second lens unit having a negative refractive power, which moves toward the image side during zooming from the wide angle end to the telephoto end, a third lens unit having a positive refractive power, which moves toward the image side during zooming from the wide angle end to the telephoto end; a fourth lens unit having a positive refractive power, winch moves toward the object side during zooming from the wide angle end to the telephoto end, a fifth lens unit having a positive refractive power, which moves during zooming from the wide angle end to the telephoto end, and a sixth lens unit having a positive refractive power, which does not move for zooming, in which, when a focal length fm at an intermediate zoom position is expressed by $fm=fw\times(Z)^{1/2}$ where fw represents a focal length of the zoom lens at a wide angle end, and Z represents a zoom ratio, the following conditional expressions are satisfied;

$$1.5 < L2fm/L2W < 500;$$

$$-30 < f3/f2 < -3;$$

and $$-15 < f1/f23W < -8,$$

where L2W represents an interval between the second lens unit and the third lens unit at the wide angle end, L2fm represents an interval between the second lens unit and the third lens unit at a zoom position as which an offaxial principal ray having a largest image height is farthest from an optical axis on a lens surface disposed on the most object side in the first lens unit in a zoom range from the wide angle end to the focal length fm, f1 represents a focal length of the first lens unit, f2 represents a focal length of the second lens unit, f3 represents a focal length of tire third lens unit, and f23W represents a combined focal length of the second lens unit and the third lens unit at the wide angle end.

According to one embodiment of the present invention, it is possible to provide the zoom lens having a small size, a wide angle of field, and a high zoom ratio as well as high optical performance over the entire zoom range, and to provide the image pickup apparatus including the zoom lens.

Further features of the present invention will become apparent from the following description of exemplary embodiments with reference to the attached drawings.

BRIEF DESCRIPTION OF THE DRAWINGS

FIG. 1 is a lens cross-sectional view at wide angle end of a zoom lens of Numerical Embodiment 1 according to the present invention.

FIG. 2A is an aberration diagram at wide angle end in focus at infinity of the zoom lens of Numerical Embodiment 1.

DESCRIPTION OF THE EMBODIMENTS

In the following, an exemplary embodiment of the present invention is described in detail with reference to the attached drawings. First, a feature of a zoom lens according to the present invention is described.

The zoom lens according to the present invention includes, in order from an object side to an image side, a first lens unit having a positive refractive power, which has a focusing function and does not move for zooming, a second lens unit having a negative refractive power, which moves during zooming, a third lens unit having a positive refractive power, which moves during zooming, a fourth lens unit having a positive refractive power, which corrects image plane variation caused by zooming, and a fifth lens unit having a positive refractive power, which does not move for zooming.

Alternatively, the zoom lens according to the present invention includes, in order from an object side to an image side, a first lens unit having a positive refractive power, which has a focusing function and does not move for zooming, a second lens unit having a negative refractive power, which moves during zooming, a third lens unit having a positive refractive power, which moves during zooming, a fourth lens unit having a positive refractive power, which moves during zooming, a fifth lens unit having a positive refractive power, which corrects image plane variation caused by zooming, and a sixth lens unit having a positive refractive power, which does not move for zooming.

FIG. 1 is a lens cross-sectional view at a wide angle end (focal length f=9.6 mm) in focus at infinity of a zoom lens of Embodiment 1 (Numerical Embodiment 1) according to line present invention.

FIGS. 2A, 2B, 2C, and 2D are aberration diagrams respectively at the wide angle end (focal length f=9.6 mm), at a focal length f=17.17 mm, at a focal length f=69.06 mm, and at a telephoto end (focal length f=710.4 mm) in focus at infinity in Numerical Embodiment 1. Here, the focal lengths are values when the values of Numerical Embodiment are expressed by unit of mm. The same is true in the following embodiments.

Figure 2B:
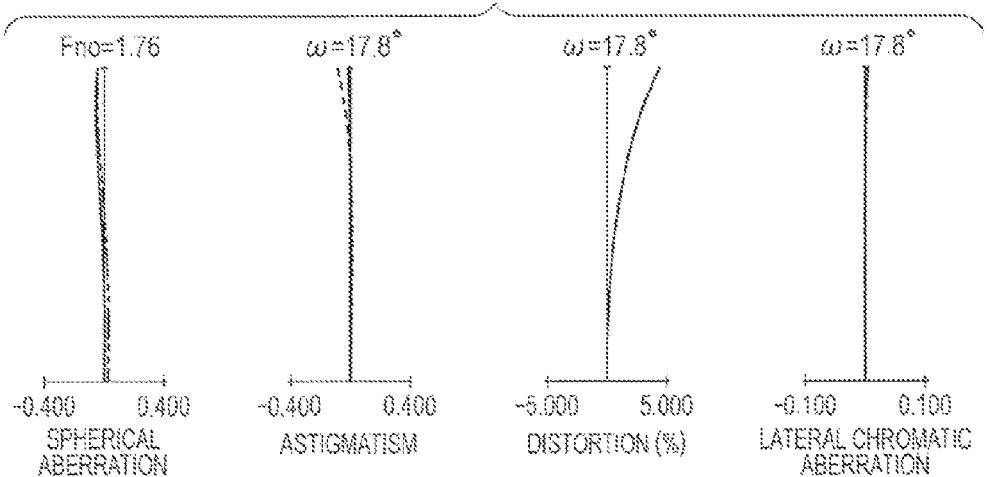
FIG. 2B is an aberration diagram at f=17.17 mm in focus at infinity of the zoom lens of Numerical Embodiment 1.
Figure 2C:
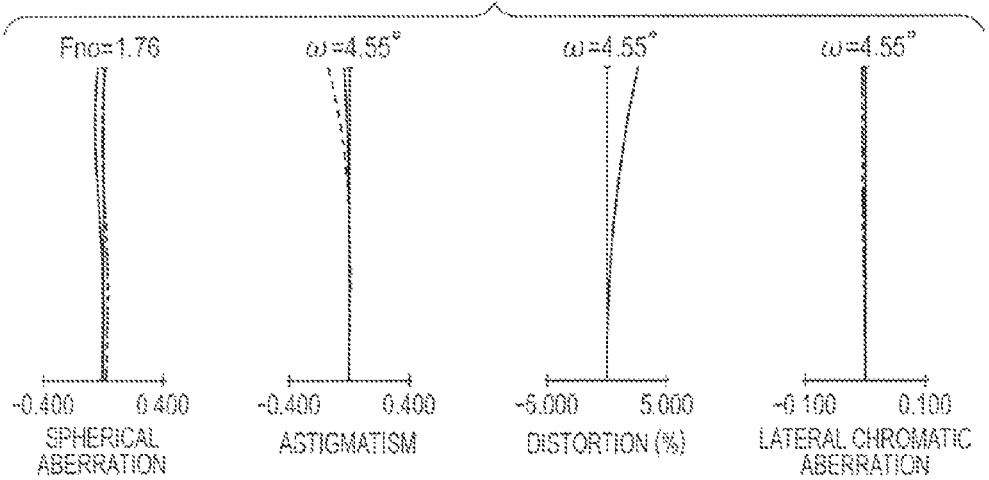
FIG. 2C is an aberration diagram at f=69.06 mm in focus at infinity of the zoom lens of Numerical Embodiment 1.
Figure 2D:
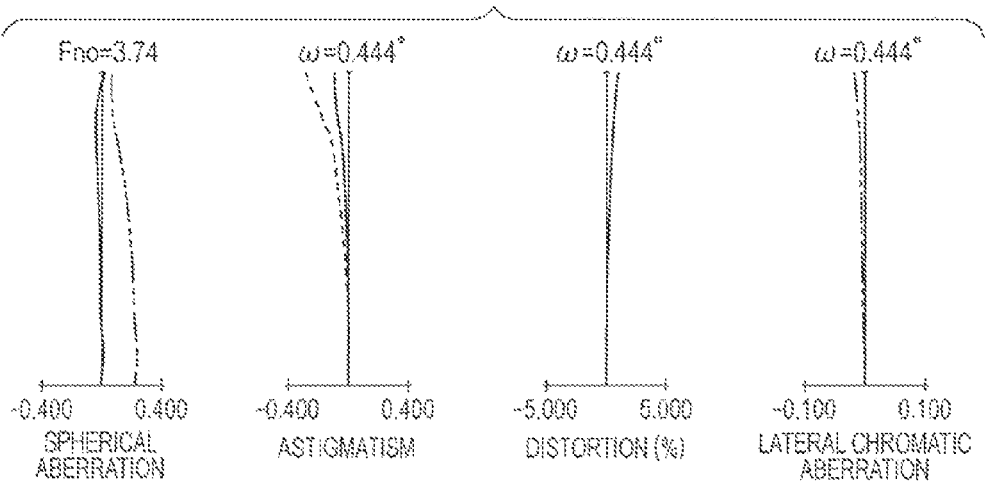
FIG. 2D is an aberration diagram at telephoto end in focus at infinity of the zoom lens of Numerical Embodiment 1.
Figure 3:
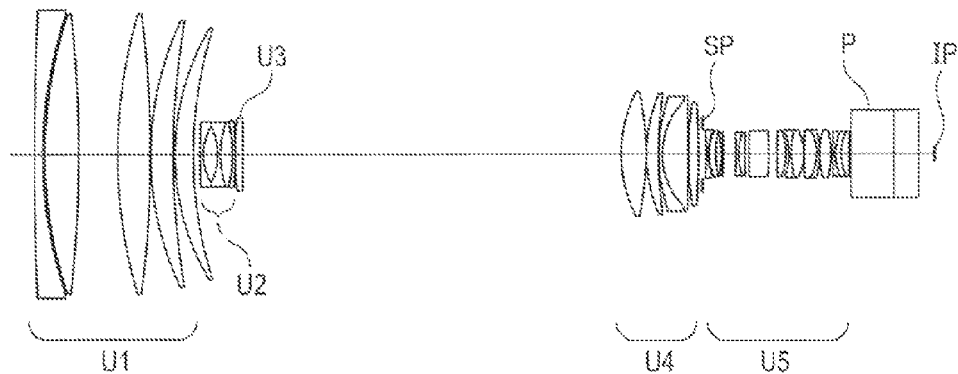
FIG. 3 is a lens cross-sectional view at wide angle end of a zoom lens of Numerical Embodiment 2 according to the present invention.
Figure 4A:
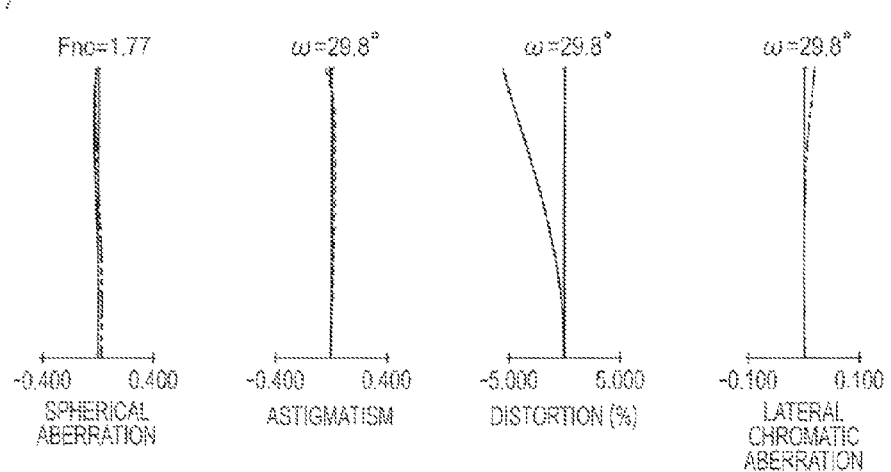
FIG. 4A is an aberration diagram at wide angle end in focus at infinity of the zoom lens of Numerical Embodiment 2.
Figure 4B:
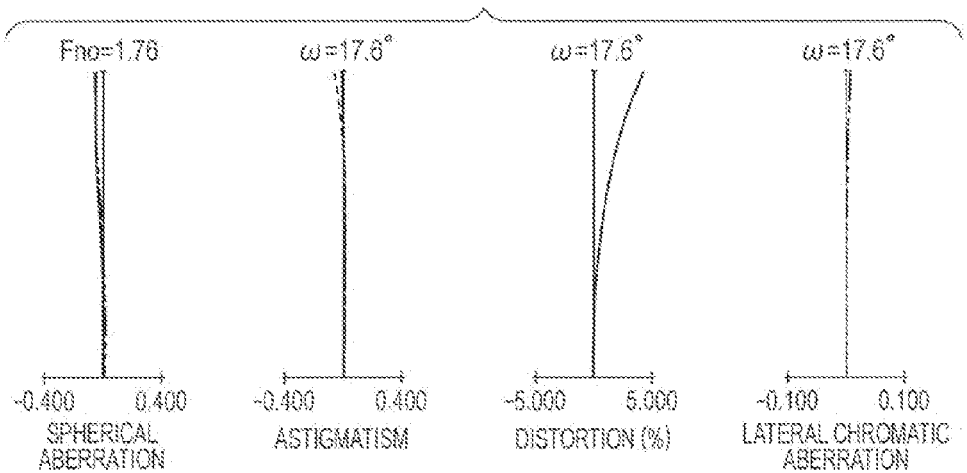
FIG. 4B is an aberration diagram at f=17.35 mm in focus at infinity of the zoom lens of Numerical Embodiment 2.
Figure 4C:
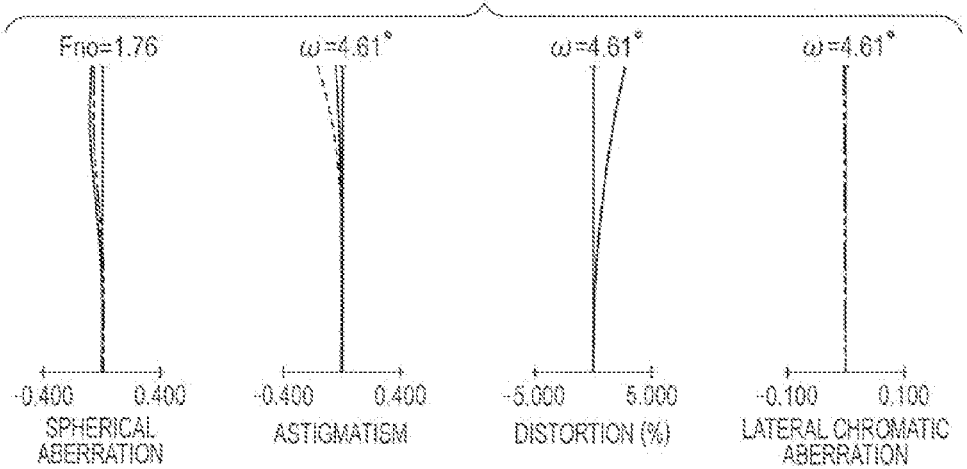
FIG. 4C is an aberration diagram at f=68.27 mm in focus at infinity of the zoom lens of Numerical Embodiment 2.
Figure 4D:
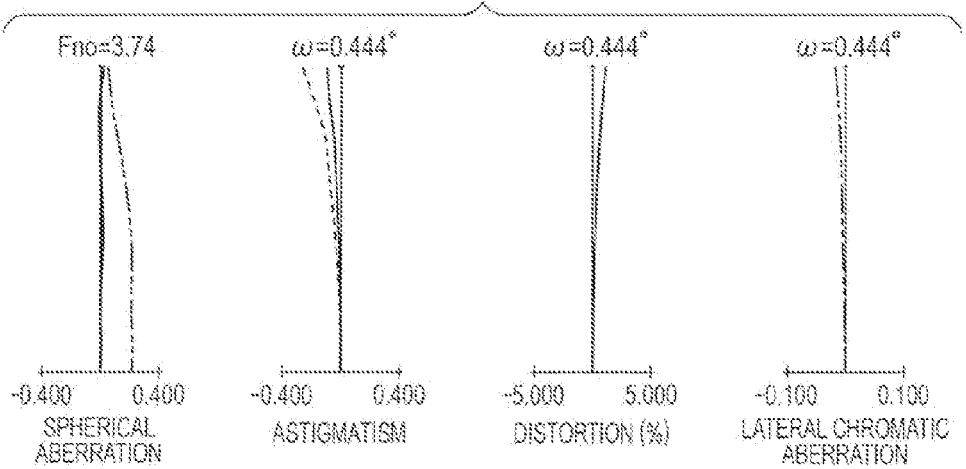
FIG. 4D is an aberration diagram at telephoto end in focus at infinity of the zoom lens of Numerical Embodiment 2.

FIG. 3 is a lens cross-sectional view at a wide angle end (focal length f=9.6 mm) in focus at infinity of a zoom lens of Embodiment 2 (Numerical Embodiment 2) according to the present invention.

FIGS. 4A, 4B, 4C, and 4D are aberration diagrams respectively at the wide angle end (focal length f=9.6 mm), at a focal length f=17.35 mm, at a focal length f=68.27 mm, and at a telephoto end (focal length f=710.4 mm) in focus at infinity in Numerical Embodiment 2.

Figure 5:
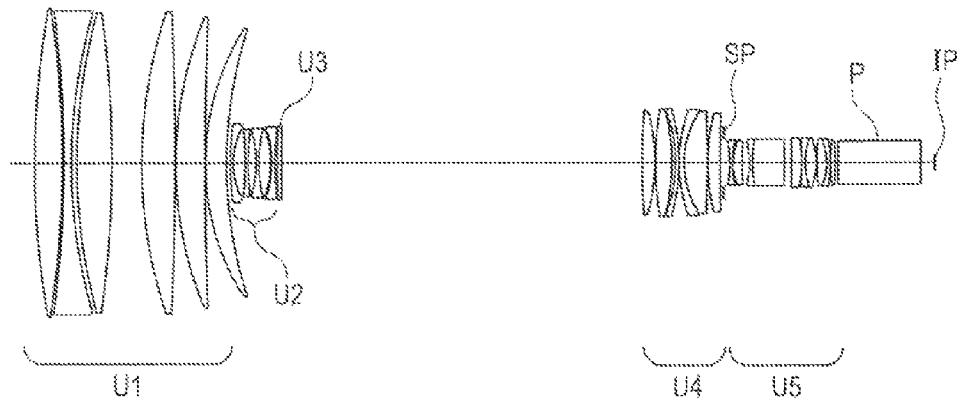
FIG. 5 is a lens cross-sectional view at wide angle end of a zoom lens of Numerical Embodiment 3 according to the present invention.
Figure 6A:
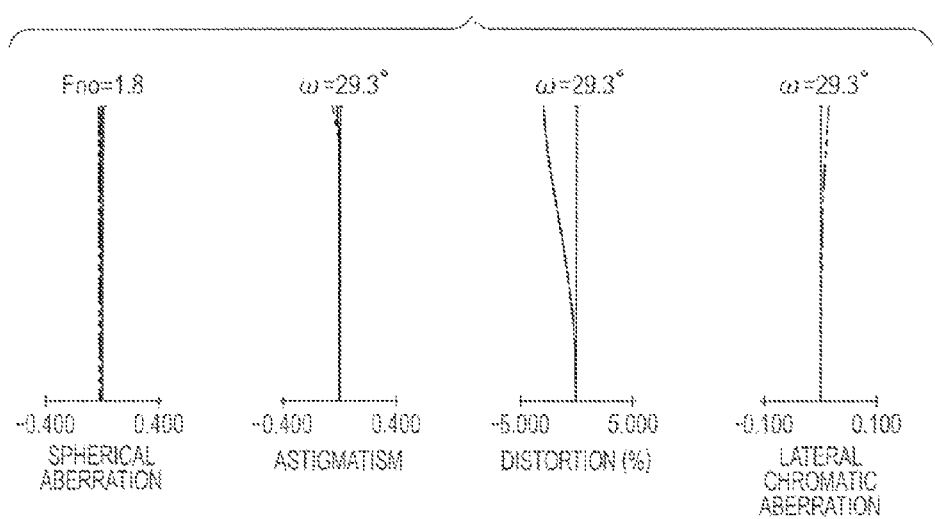
FIG. 6A is an aberration diagram at wide angle end in focus at infinity of the zoom lens of Numerical Embodiment 3.
Figure 6B:
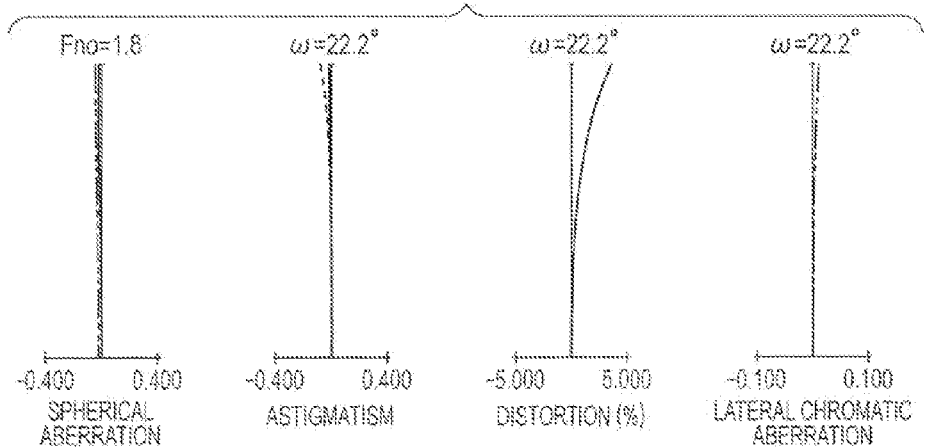
FIG. 6B is an aberration diagram at f=13.50 mm in focus at infinity of the zoom lens of Numerical Embodiment 3.
Figure 6C:
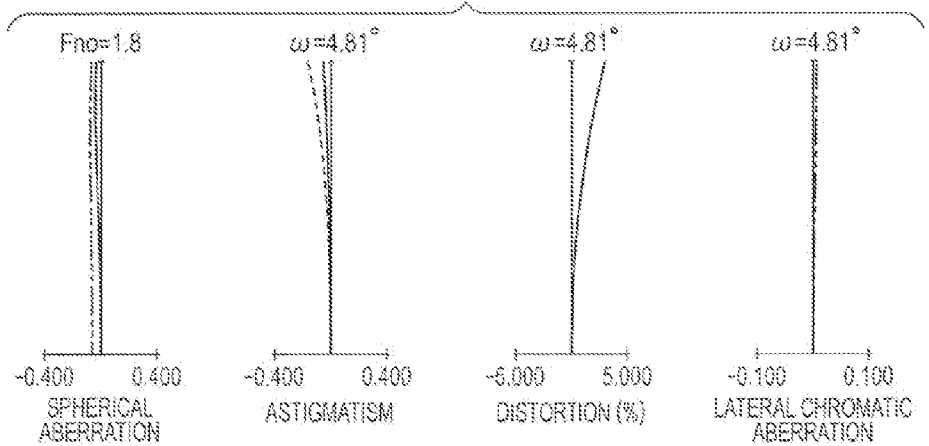
FIG. 6C is an aberration diagram at f=65.35 mm in focus at infinity of the zoom lens of Numerical Embodiment 3.
Figure 6D:
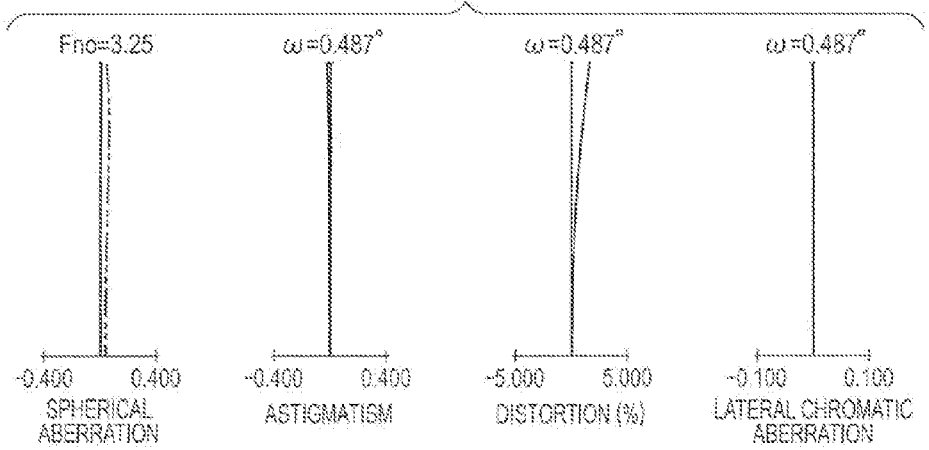
FIG. 6D is an aberration diagram at telephoto end in focus at infinity of the zoom lens of Numerical Embodiment 3.

FIG. 5 is a cross-sectional view at a wide angle end (focal length f=9.8 mm) in focus at infinity of a zoom lens of Embodiment 3 (Numerical Embodiment 3) according to the present invention.

FIGS. 6A, 6B, 6C, and 6D are aberration diagrams respectively at the wide angle end (focal length f=9.8 mm), as a focal length f=13.50 mm, at a focal length f=65.35 mm, and at a telephoto end (focal length f=646.8 mm) in focus at infinity in Numerical Embodiment 3.

Figure 7:
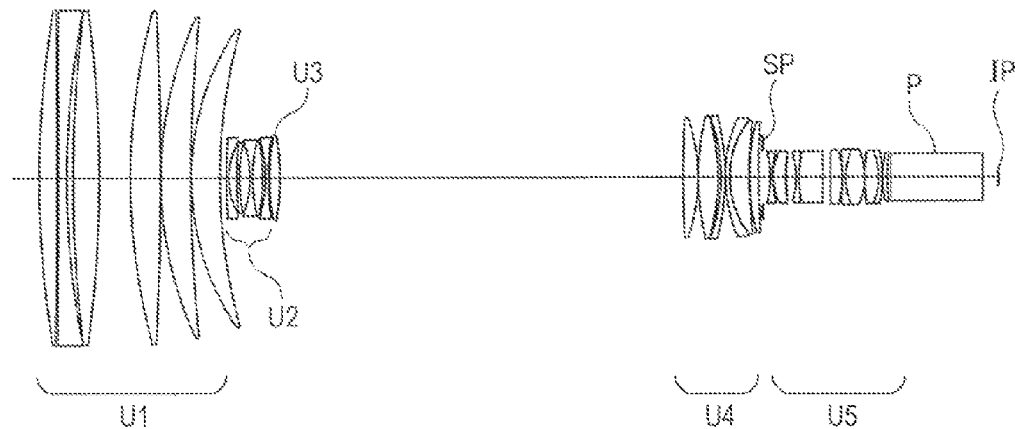
FIG. 7 is a lens cross-sectional view at wide angle end of a zoom lens of Numerical Embodiment 4 according to the present invention.
Figure 8A:
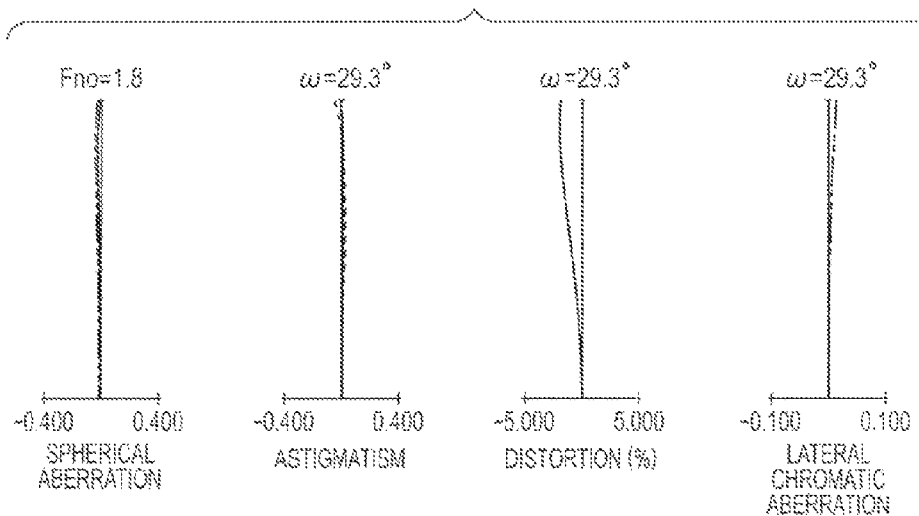
FIG. 8A is an aberration diagram at wide angle end in focus at infinity of the zoom lens of Numerical Embodiment 4.
Figure 8B:
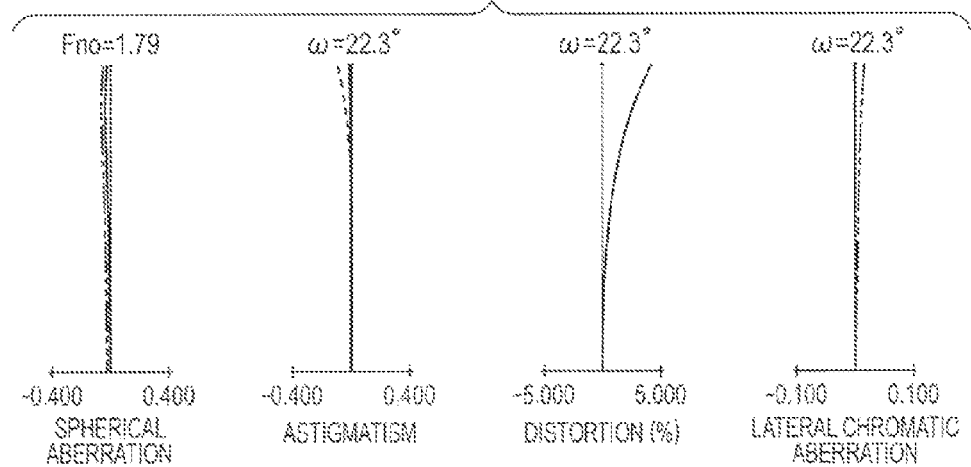
FIG. 8B is an aberration diagram at f=13.41 mm in focus at infinity of the zoom lens of Numerical Embodiment 4.
Figure 8C:
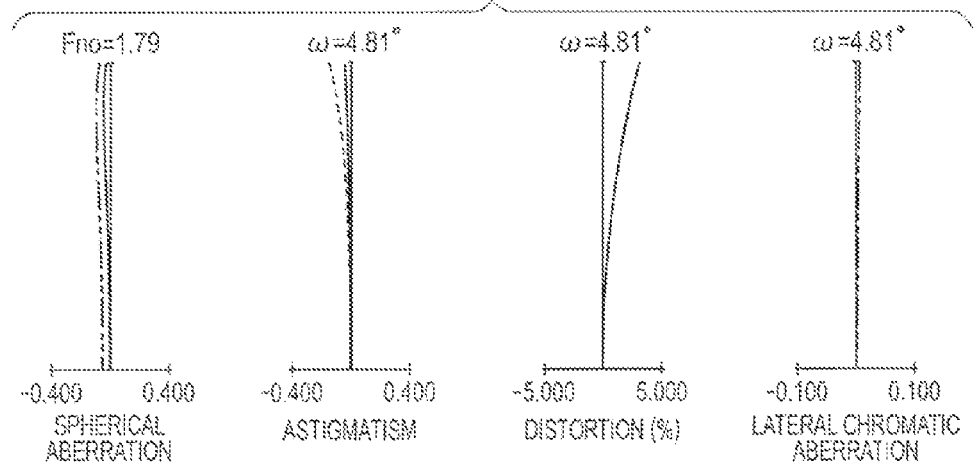
FIG. 8C is an aberration diagram at f=65.33 mm in focus at infinity of the zoom lens or Numerical Embodiment 4.
Figure 8D:
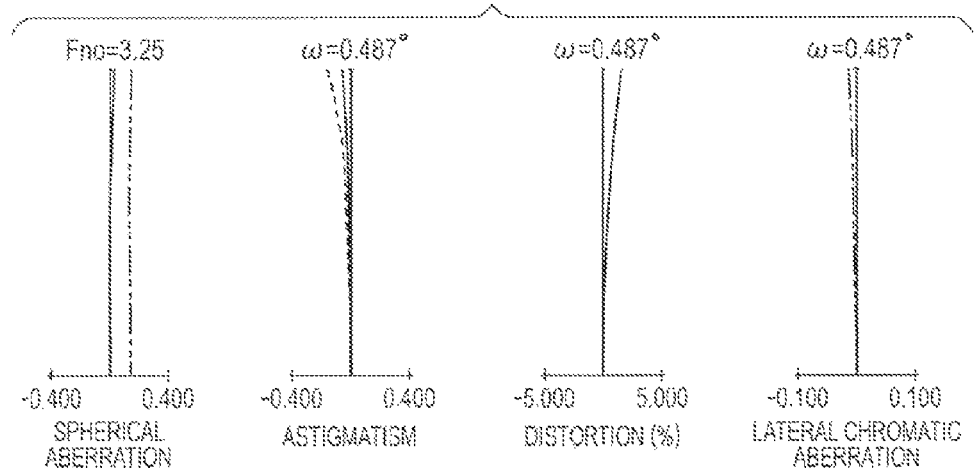
FIG. 8D is an aberration diagram at telephoto end in focus at infinity of the zoom lens of Numerical Embodiment 4.

FIG. 7 is a lens cross-sectional view at a wide angle end (focal length f=9.8 mm) in focus at infinity of a zoom lens of Embodiment 4 (Numerical Embodiment 4) according to the present invention.

FIGS. 8A, 8B, 8C, and 8D are aberration diagrams respectively at the wide angle end (focal length f=9.8 mm), at a focal length f=13.41 mm, at a focal length f=65.33 mm, and at a telephoto end (focal length f=646.8 mm) in focus at infinity in Numerical Embodiment 4.

Figure 9:
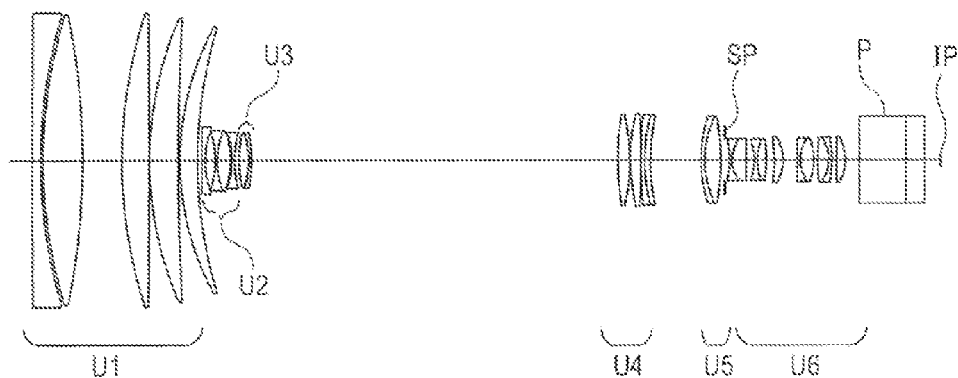
FIG. 9 is a lens cross-sectional view at wide angle end of a zoom lens of Numerical Embodiment 5 according to the present invention.
Figure 10A:
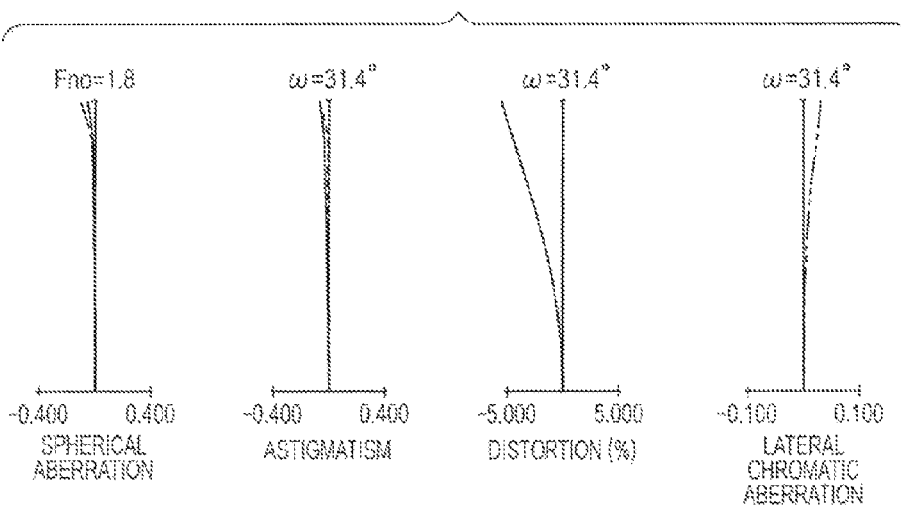
FIG. 10A is an aberration diagram at wide angle end in focus at infinity of the zoom lens of Numerical Embodiment 5.
Figure 10B:
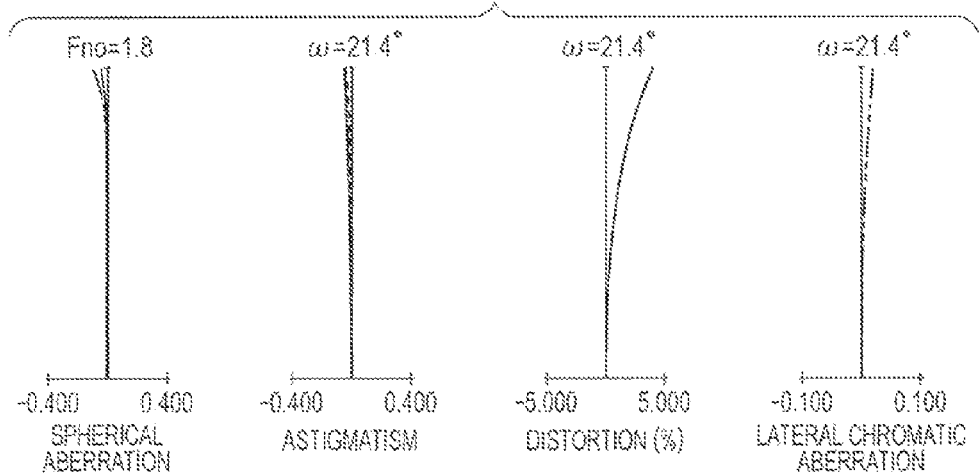
FIG. 10B is an aberration diagram at f=14.01 mm in focus at infinity of the zoom lens of Numerical Embodiment 5.
Figure 10C:
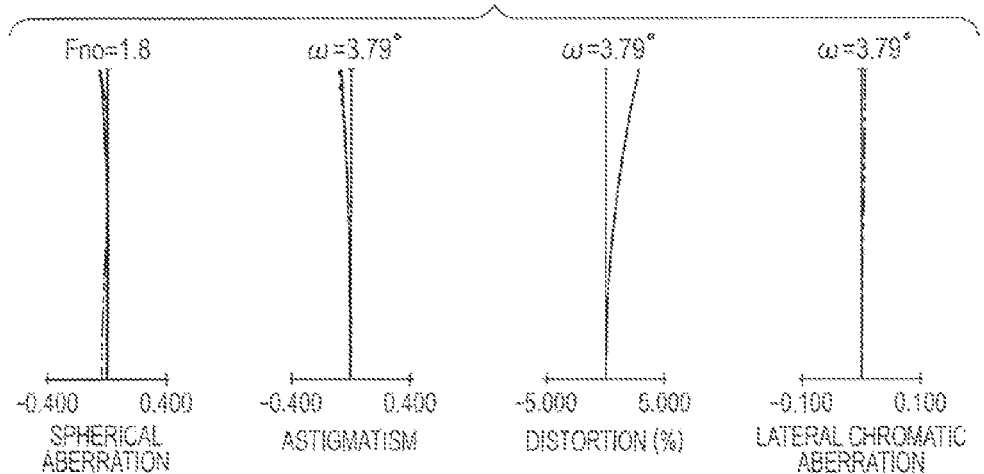
FIG. 10C is an aberration diagram at f=82.92 mm in focus at infinity of the zoom lens of Numerical Embodiment 5.
Figure 10D:
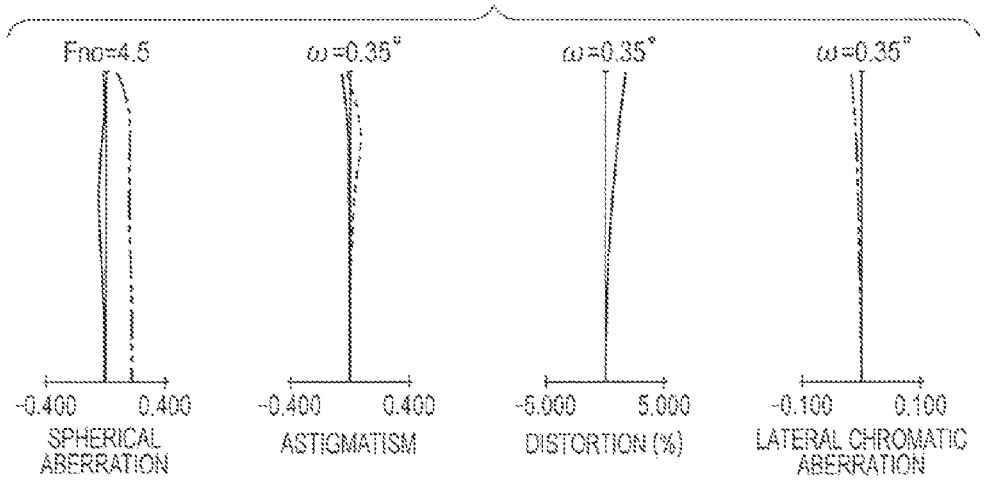
FIG. 10D is an aberration diagram at telephoto end in focus at infinity of the zoom lens of Numerical Embodiment 5.

FIG. 9 is a lens cross-sectional view at a wide angle end (focal length f=9.0 mm) in focus at infinity of a zoom lens of Embodiment 5 (Numerical Embodiment 5) according to the present invention.

FIGS. 10A, 10B, 10C, and 10D are aberration diagrams respectively at the wide angle end (focal length f=9.0 mm), at a focal length f=14.01 mm, at a focal length f=82.92 mm, and at a telephoto end (focal length f=900 mm) in focus at infinity in Numerical Embodiment 5.

Figure 12:
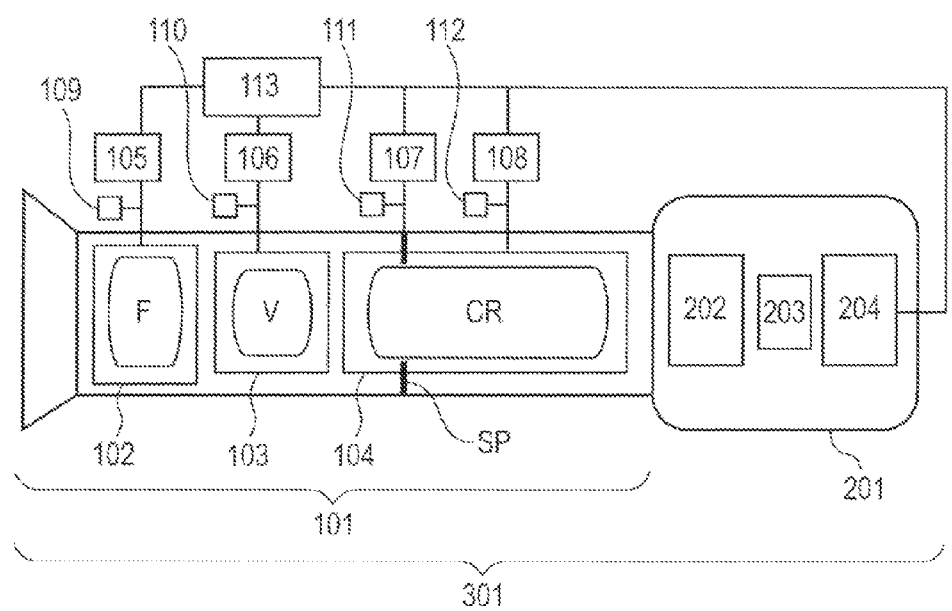
FIG. 12 is a schematic diagram of an image pickup apparatus of the present invention.

FIG. 12 is a schematic diagram of an image pickup apparatus of the present invention.

In the lens cross-sectional view of each embodiment, the left side corresponds to an object side, and the right side corresponds to an image side. In the lens cross-sectional views of Embodiments 1 to 4, a front lens unit having a positive refractive power corresponds to a first lens unit U1, which does not move for zooming. The first lens unit U1 moves partly or entirely so as to perform a focusing function.

A variator having a negative refractive power corresponds to a second lens unit U2 for zooming, which moves monotonously toward an image plane side on an optical axis so as to perform zooming from the wide angle end to the telephone end.

A variator having a positive refractive power corresponds to a third lens unit U3 for zooming, which moves toward the image plane side drawing a curve on the optical axis so as to perform zooming from the wide angle end to the telephoto end.

A compensator having a positive refractive power corresponds to a fourth lens unit U4, which moves non-linearly toward the object side on the optical axis during zooming from the wide angle end to the telephoto end so as to correct image plane variation caused by zooming.

The second lens unit U2, the third lens unit U3, and the fourth lens unit U4 constitute a zoom system.

A stop (aperture stop) SP is disposed on the object side of a fifth lens unit U5. A fixed relay lens unit having a positive refractive power with an image forming action corresponds to the fifth lens unit U5. A color separation prism, an optical filter, or the like is denoted by P and is illustrated as a glass block in the figures. An image plane IP corresponds to an image plane of a solid-state image pickup element (photoelectric conversion element) for receiving light of an image formed by the zoom lens so as to perform photoelectric conversion.

In a lens cross-sectional view of Embodiment 5, a front lens unit having a positive refractive power corresponds to a first lens unit U1, which does not move for zooming. The first lens unit U1 moves partly or entirely so as to perform a focusing function.

A variator having a negative refractive power corresponds to a second lens unit U2 for zooming, which moves monotonously toward an image plane side on an optical axis so as to perform zooming from the wide angle end to the telephoto end.

A variator having a positive refractive power corresponds to a third lens unit U3 for zooming, which moves toward the image plane side drawing a curve on the optical axis so as to perform zooming from the wide angle end to the telephoto end.

A variator having a positive refractive power corresponds to a fourth lens unit U4 for zooming, which moves toward the object side drawing a curve on the optical axis so as to perform zooming from the wide angle end to the telephoto end.

A compensator having a positive refractive power corresponds to a fifth lens unit U5, which moves non-linearly toward the object side on the optical axis during zooming from the wide angle end to the telephoto end so as to correct image plane variation caused by zooming.

The second lens unit U2, the third lens unit U3, the fourth lens unit U4, and the fifth lens unit U5 constitute a zoom system.

A stop (aperture stop) SP is disposed on the object side of a sixth lens unit U6. A fixed relay lens unit having a positive refractive power with an image forming action corresponds to the sixth lens unit U6. A color separation prism, an optical filter, or the like is denoted by P and is illustrated as a glass block in the figure. An image plane IP corresponds to an image plane of a solid-state image pickup element (photoelectric conversion element) for receiving light of an image formed by the zoom lens so as to perform photoelectric conversion.

In the aberration diagrams, a solid line and a two-dot chain line of spherical aberration represent an e-line and a g-line, respectively. A dotted line and a solid line or astigmatism represent a meridional image plane and a sagittal image plane, respectively. Lateral chromatic aberration is represented by a g-line. A half angle of field is denoted by ω, and an F-number is denoted by Fno. Spherical aberration is shown at a scale of 0.4 mm, astigmatism is shown at a scale of 0.4 mm, distortion is shown at a scale of 5%, and lateral chromatic aberration is shown at a scale of 0.1 mm.

Further, in the following embodiments, the wide angle end and the telephoto end mean zoom positions when the lens unit (second lens unit U2) for zooming is positioned at each end of a mechanically movable range on the optical axis.

Each embodiment has a feature of satisfying the following conditions:

$$1.5 < L2fm/L2W < 500 \quad (1);$$

$$-30 < f3/f2 < -3 \quad (2);$$

and $$-15 < f1/f23W < -8 \quad (3).$$

In the conditional expressions, a focal length fm at an intermediate zoom position (at $(Z)^{1/2}$) is expressed by $fm = fw \times (Z)^{1/2}$ where fw represents a focal length of the entire system at the wide angle end, and Z represents a zoom ratio ((the focal length at telephoto end)/(the focal length at wide angle end)). Further, L2W represents an interval between the second lens unit and the third lens unit at the wide angle end, L2fm represents an interval between the second lens unit and the third lens unit at a zoom position at which an offaxial principal ray having a largest image height becomes farthest from the optical axis in a zoom range from the wide angle end to the focal length fm, f1 represents a focal length of the first lens unit, f2 represents a focal length of the second lens unit, f3 represents a focal length of the third lens unit, and f23W represents a combined focal length of the second lens unit and the third lens unit at the wide angle end.

The conditional expression (1) appropriately defines an interval between the second lens unit U2 and the third lens unit U3, and focal lengths thereof at the wide angle end and the zoom position of the focal length fm, so as to reduce an effective lens diameter or the first lens unit U1.

Figure 11A:
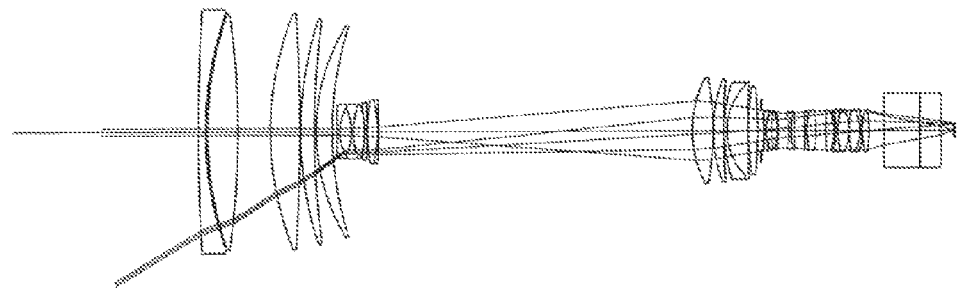
FIGS. 11A-11D are optical path diagrams illustrating height variations of offaxial principal rays due to zooming.
Figure 11B:
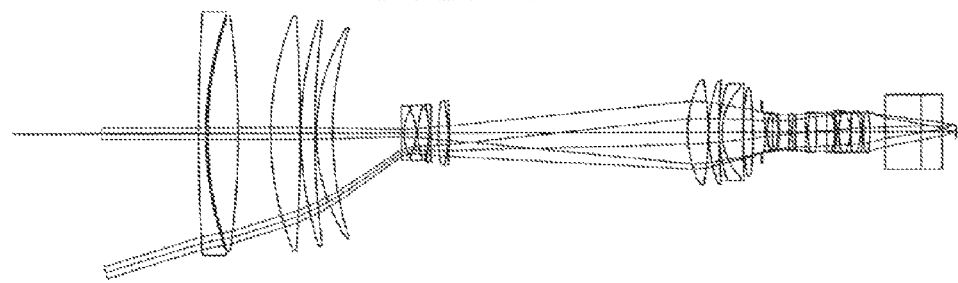
Figure 11C:
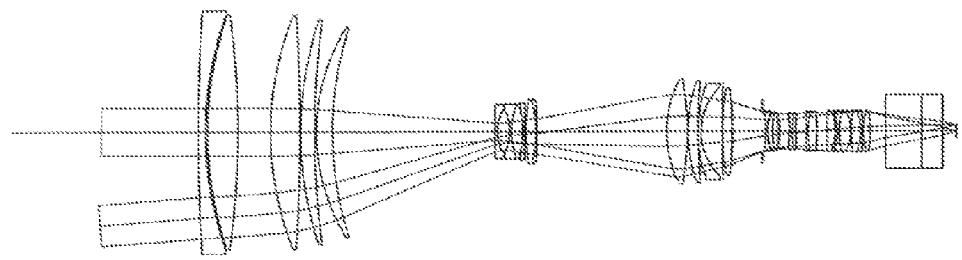
Figure 11D:
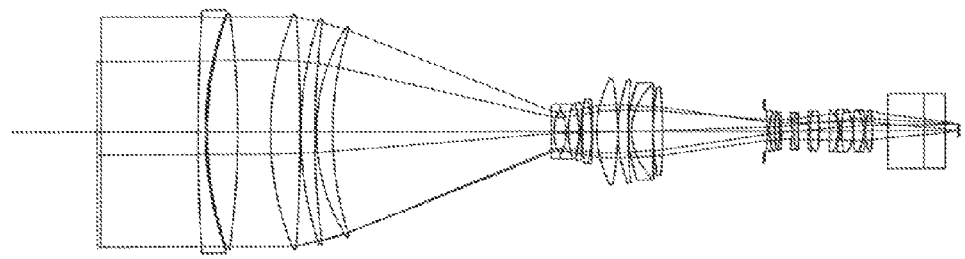

As a lens having a high magnification more than 60, a four-unit zoom lens is widely used because the four-unit zoom lens can easily have a higher magnification. The four-unit zoom lens includes, in order from the object side, positive, negative, positive, and positive lens units. The negative second unit and the positive third unit constitute the zoom system. In a case of this four-unit zoom lens, a movement amount of the second unit is large with respect to a zoom ratio in the zoom range from the wide angle end to the focal length fm. FIGS. 11A, 11B, 11C and 11D are optical path diagrams illustrating variations of optical path due to zooming. FIG. 11B illustrates the optical path at the wide angle end, FIG. 11B illustrates the optical path at a focal position at which the offaxial principal ray having the largest image height becomes highest, FIG. 11C illustrates the optical path at the focal length fm, and FIG. 11D illustrates the optical path at the telephoto end. As illustrated in FIGS. 11A, 11B, 11C, and 11D, the interval between the first unit and the second unit is increased before a photographing angle or field is decreased in zooming from the wide angle end to the telephoto end, particularly in the zoom range from the wide angle end to the focal length fm.

In addition, as illustrated in FIGS. 11A, 11B, 11C, and 11D, in the zoom range from the wide angle end to the focal length fm, there is a zoom position at which the offaxial principal ray that has the largest image height and enters a first lens unit U1 becomes highest (FIG. 11B).

In the zoom range from the wide angle end to the focal length fm, in order to include the same angle of field and to lower the offaxial principal ray that has the largest image height and enters the first lens unit U1, the zoom ratio is only required to be secured in a state where the first unit is closer to the second unit.

Each embodiment represents a five-unit zoom lens including, in order from the object side, positive, negative, positive, positive, and positive lens units, or a six-unit zoom lens including, in order from the object side, positive, negative, positive, positive, positive, and positive lens units, in which movement loci of the second unit and the third unit during zooming are appropriately set. In this way, in the zoom range from the wide angle end to the focal length fm, a height of the offaxial principal ray that has the largest image height and enters the first lens unit U1 is lowered so that a lens diameter of the first lens unit U1 is not increased.

Specifically, a second lees unit U2 moves monotonously toward the image plane side on the optical axis during zooming from the wide angle end to the telephoto end. A third lens unit U3 moves non-linearly (drawing a curve) toward the image plane side on the optical axis during zooming from the wide angle end to the telephoto end so that the interval between the second lens unit U2 and the third lens unit U3 is increased. The third lens unit U3 has a positive lateral magnification β3 and moves toward the image plane side so as to increase the focal length of the entire system. Therefore, when an interval L2 between the second lens unit U2 and the third lens unit U3 is increased while an interval L1 between the first lens unit U1 and the second lens unit U2 is maintained to be small, the focal length of the entire system is increased. Thus, an incident height of an offaxial ray on the first lens unit U1 is lowered so as to prevent increase of the lens diameter of the first lens unit U1.

When the ratio exceeds the upper limit value of the conditional expression (1), the interval between the second lens unit U2 and the third lens unit U3 becomes large so that an incident height of the axial ray on the third lens unit U3 is increased in the zoom range from the wide angle end to the focal length fm. For this reason, variations of spherical aberration, coma, and the like due to zooming are increased in the zoom range from the wide angle end to the focal length fm, and hence it becomes difficult to obtain good optical performance.

When the ratio falls below the lower limit value of the conditional expression (1), because the interval between the second lens unit U2 and the third lens unit U3 is small in the zoom range from the wide angle end to the focal length fm, the effect of lowering the incident height of the offaxial ray on the first lens unit U1 is decreased, and hence it becomes difficult to achieve the first lens unit U1 with a smaller size and a lighter weight.

The conditional expression (2) defines a ratio between the focal length of the second lens unit U2 and the focal length of the third lens unit U3. When the ratio exceeds the upper limit value of the conditional expression (2), a refractive power of the third lens unit U3 becomes small so that the effect of lowering the incident height of the offaxial ray on the first lens unit U1 is decreased, and hence it becomes difficult to achieve the first lens unit U1 with a smaller size and a lighter weight. When the ratio falls below the lower limit value of the conditional expression (2), the refractive power of the third lens unit U3 becomes large so that variations of spherical aberration, coma, and the like due to zooming are increased in the zoom range from the wide angle end to the focal length fm, and hence it becomes difficult to obtain good optical performance.

The conditional expression (3) defines a ratio between the focal Length of the first lens unit U1 and a combined focal length of the second lens unit U2 and the third lens unit U3. When the ratio exceeds the upper limit value of the conditional expression (3), a combined refractive power of the second lens unit U2 and the third lens unit U3 becomes large with respect to a refractive power of the first lens unit U1 so that variations of various aberrations due to zooming are increased, and hence it becomes difficult to obtain good optical performance. When the ratio falls below the lower limit value of the conditional expression (3), the combined refractive power of the second lens unit U2 and the third lens unit U3 becomes small with respect to the refractive power of the first lens unit U1. For this reason, movement amounts of the second lens unit U2 and the third lens unit U3 necessary for zooming are increased so that the entire length becomes long, and hence it becomes difficult to achieve a higher zoom ratio while achieving a smaller size and a lighter weight.

It is more preferred to set the numerical ranges of the conditional expressions (1) to (3) as follows.

$$2 < L2fm/L2W < 350 \tag{1a}$$

$$-22 < f3/f2 < -4.5 \tag{2a}$$

$$-12 < f1/f23W < -8.2 \tag{3a}$$

In each embodiment, it is more preferred to satisfy the following conditional expression (4):

$$-2.2 < (L1fm - L1W)/f23wm < -0.5 \tag{4}$$

where L1W represents an interval between the first lens unit and the second lens unit at the wide angle end, f23wm represents a combined focal length of the second lens unit and the third lens unit at a zoom position at which the offaxial principal ray having the largest image height is farthest from the optical axis in the zoom range from the wide angle end to the focal length fm, and L1fm represents an interval between the first lens unit and the second lens unit at the zoom position.

The conditional expression (4) defines a ratio between a variation of the interval between the first lens unit U1 and the second lens unit U2 at a zoom position at which the incident height of the offaxial ray on the first lens suit U1 becomes largest in the zoom range from the wide angle end to the focal length fm and the combined focal length of the second lens unit and the third lens unit at the zoom position. When the ratio exceeds the upper limit value of the conditional expression (4), the variation or the interval between the first lens unit U1 and the second lens unit U2 becomes large so that the effect of lowering the incident height of the offaxial ray on the first lens unit U1 becomes small, and hence it becomes difficult to achieve the first lens unit U1 with a smaller size and a lighter weight. When the ratio falls below the lower limit value of the conditional expression (4), refractive powers of the second lens unit U2 and the third lens unit U3 become large so that variations of various aberrations due to zooming are increased, and hence it becomes difficult to obtain good optical performance.

It is more preferred to set the numerical ranges of the conditional expression (4) as follows.

$$-2.0<(L1fm-L1W/fwm<-0.7 \quad (4a)$$

Further, when the third lens unit U3 is composed of a single convex lens as Embodiments 2 to 4, it is more preferred to satisfy the following conditional expressions (5) and (6):

$$1.40<nd<1.85 \quad (5);$$

and $$40<vd<96 \quad (6),$$

where nd represents a refractive index of the convex lens on a d-line, and vd represents an Abbe constant of the convex lens on the d-line.

The conditional expressions (5) and (6) define the refractive index and the Abbe constant on the d-line of a glass material when the third lens unit is composed of the single convex lens. In the zoom range from the wide angle end to the focal length fm, when the interval between the second lens unit U2 and the third lens unit U3 is increased so that the incident height of the axial ray on the third lens unit U3 becomes large, variations of spherical aberration and axial chromatic aberration are increased. When the refractive index exceeds the upper limit value or falls below the lower limit value of the conditional expression (5) or the Abbe constant exceeds the upper limit value or falls below too lower limit value of too conditional expression (6), it becomes difficult so achieve variation correction of both spherical aberration and axial lateral chromatic aberration, and hence good optical performance cannot be obtained.

When the third lens unit U3 is composed of the single convex lens, if is more preferred to set the conditional expressions (5) and (6) as follows.

$$1.43<nd<1.80 \quad (5a)$$

$$45<vd<95.5 \quad (6a)$$

Further, when the third lens unit U3 includes at least one convex lens and at least one concave lens as Embodiments 1 and 5, it is more preferred to satisfy the following conditional expressions (7) and (8):

$$-0.43<Ndp-Ndn<-0.1 \quad (7);$$

and $$10<vdp-vdn<45 \quad (8),$$

where Ndp represents an average value of a refractive index on the d-line of the at least one convex lens constituting the third lens unit U3, Ndn represents an average value of a refractive index on the d-line of the at least one concave lens constituting the third lens unit U3, vdp represents an average value of an Abbe constant of the at least one convex lens, and vdn represents an average value of an Abbe constant of the at least one concave lens.

The conditional expressions (7) and (8) define conditions of the glass material when the third lens unit includes at least one convex lens and at least one concave lens. When the conditions exceed the upper limit value or fall below the lower limit value of the conditional expression (7) or (8), similarly to the case where the third lens unit U3 is composed of a single convex lens, it becomes difficult to achieve variation correction of both spherical aberration and axial chromatic aberration, and hence good optical performance cannot be obtained.

When the third lens unit U3 includes at least one convex lens and at least one concave lens, it is more preferred to set the conditional expressions (7) and (8) as follows.

$$0.39<Ndp-Ndn<-0.15 \quad (7a)$$

$$15<vdp-vdn<35 \quad (8a)$$

Embodiment 1

A zoom lens of Embodiment 1 includes, in order from the object side to the image side, a first lens unit having a positive refractive power, which does not move for zooming, a second lens unit having a negative refractive power, which moves during zooming, a third lens unit having a positive refractive power, which moves during zooming, a fourth lens unit having a positive refractive power, which moves during zooming, and a fifth lens unit having a positive refractive power, which does not move for zooming. The second lens unit, the lens third unit, and the fourth lens unit constitute the zoom system. The third lens unit includes a single convex lens and a single concave lens. As shown in Table 1, the numerical embodiment corresponding to Embodiment 1 satisfies the conditional expressions (1) to (4), (7), and (8), so that a zoom lens having high optical performance, an angle of field of 59.6° at wide angle end, and a zoom ratio of 74 is achieved as a zoom lens having a wide angle of field, a high room ratio, a small size, and a light weight.

Embodiment 2

A zoom lens of Embodiment 2 includes, in order from the object side to the image side, a first lens unit having a positive refractive power, which does not move for zooming, a second lens unit having a negative refractive power, which moves during zooming, a third lens unit having a positive refractive power, which moves during zooming, a fourth lens unit having a positive refractive power, which moves during zooming, and a fifth lens unit having a positive refractive power, which does not move for zooming. The second lens unit, the third lens unit, and the fourth lens unit constitute the zoom system.

The third lens unit is composed of a single convex lens. As shown in Table 1, the numerical embodiment corresponding to Embodiment 2 satisfies the conditional expressions (1) to (4), (7), and (8), so that a zoom lens having high optical performance, an angle of field of 59.6° at wide angle end, and a zoom ratio of 74 is achieved as a zoom lens having a wide angle of field, a high zoom ratio, a small size, and a light weight.

Embodiment 3

A zoom lens of Embodiment 3 includes, in order from the object side to the image side, a first lens unit having a positive refractive power, which does not move for zooming, a second lens unit having a negative refractive power, which moves during zooming, a third lens unit having a positive refractive power, which moves during zooming, a fourth lens unit having a positive refractive power, which moves during zooming, and a fifth lens unit having a positive refractive power, which does not move for zooming. The second lens unit, the third lens unit, and the fourth lens unit constitute the zoom system. The third lens unit is composed of a single convex lens. As shown in Table 1, the numerical embodiment corresponding to Embodiment 3 satisfies the conditional expressions (1) to (6), so that a zoom lens having high optical performance, an angle of field of 57.6° at wide angle end, and a zoom ratio of 66 is achieved as a zoom lens having a wide angle of field, a high zoom ratio, a small size, and a light weight.

Embodiment 4

A zoom lens of Embodiment 4 includes, in order from the object side to the image side, a first lens unit having a positive refractive power, which does not move for zooming, a second lens unit having a negative refractive power, which moves during zooming, a third lens unit having a positive refractive power, which moves during zooming, a fourth lens unit having a positive refractive power, which moves during zooming, and a fifth lens unit having a positive refractive power, which does not move for zooming. The second lens unit, the third lens unit, and the fourth lens unit constitute the zoom systems. The third lens unit is composed of a single convex lens. As shown in Table 1, the numerical embodiment corresponding to Embodiment 4 satisfies the conditional expressions (1) to (6), so that a zoom lens having high optical performance, an angle of field of 57.6° at wide angle end, and a zoom ratio of 66 is achieved as a zoom lens having a wide angle of field, a high zoom ratio, a small size, and a light weight.

Embodiment 5

A zoom lens of Embodiment 5 includes, in order from the object side to the image side, a first lens unit having a positive refractive power, which does not move for zooming, a second lens unit having a negative refractive power, which moves during zooming, a third lens unit having a positive refractive power, which moves during zooming, a fourth lens unit having a positive refractive power, which moves during zooming, a fifth lens unit having a positive refractive power, which moves during zooming and a sixth lens unit having a positive refractive power, which does not move for zooming. The second lens unit to the fifth lens unit constitute the zoom system. The third lens unit is composed of a single convex lens. As shown in Table 1, the numerical embodiment corresponding to Embodiment 5 satisfies the conditional expressions (1) to (4), (7), and (8), so that a zoom lens having high optical performance, a photographing angle of field of 62.9° at wide angle end, and a zoom ratio of 100 is achieved as a zoom lens having a wide angle or field, a high zoom ratio, a small size, and a light weight.

As described above, according to each embodiment, if is possible a provide a zoom lens and an image pickup apparatus including the zoom lens, which can achieve both a wider angle of field and a higher zoom ratio while achieving the entire lens system with a smaller size and a lighter weight.

The exemplary embodiment of the present invention is described above, but the present invention is not limited to the embodiment, and can be modified and changed variously within the scope of the spirit.

FIG. 12 is a schematic diagram of the image pickup apparatus (television camera system) in which the zoom lens of each embodiment is used as a photographing optical system. In FIG. 12, the zoom lens according to any one of Embodiments 1 to 5 is denoted by 101, and a camera is denoted by 201. The zoom lens 101 can be mounted to and removed from the camera 201. An image pickup apparatus 301 is constituted when the zoom lens 101 is mounted to the camera 201. The zoom lens 101 includes a first lens unit F, second and third (or second to fourth) lens units V, and a lens unit CR after the third (or fourth) lens unit. The first lens unit F includes a focusing lens unit. The second and third (or the second to fourth) lens units V move for zooming on the optical axis. The lens unit CR after the second and third (or the second to fourth) lens units V includes a fourth (or fifth) lens unit C which moves on the optical axis for correcting the image plane variation caused by zooming and a fifth (or sixth) lens unit R for image formation. Further, the lens unit CR may include a lens unit (extender) that can be inserted in and removed from the optical path so as to change a focal length of the entire zoom lens system.

In addition, the lens unit CR may include an image stabilizing optical system that is moved in a direction perpendicular to the optical axis so as to stabilize an image. An aperture stop is denoted by SP. Drive mechanisms 102 to 104 include a helicold, a cam, or the like, for driving respectively in the optical axis direction the first lens unit F, the second and third (or the second to fourth) lens units V, and the fourth (or fifth) lens unit C for correcting image plane variation caused by zooming.

Here, motors 105 to 108 (drive units) electrically drive the drive mechanisms 102 to 104 and the aperture stop SP. Detectors 109 to 112 each include an encoder, a potentiometer, a photosensor, or the like, for detecting a position of the first lens unit F, the second lens unit V, or the third lens unit C for correcting image plane variation caused by zooming on the optical axis, or detecting a diameter of the aperture stop SP. In the camera 201, a glass block 202 corresponds to an optical filter or a color separation optical system, and a solid-state image pickup element 203 (photoelectric conversion element) such as a CCD sensor or a CMOS sensor receives light of a subject image formed by the zoom lens 101. In addition, CPUs 113 and 204 control various drives of the camera 201 and the zoom lens 101.

In this way, by applying the zoom lens of the present invention to the television camera, the image pickup apparatus having high optical performance is realized. However, the structure of the zoom lens and the camera according to the present invention is not limited to the form illustrated in FIG. 12, and can be modified and changed variously within the scope of the spirit. Other than that, the zoom lens of the present invention can also be applied to a digital camera, a video camera, or the like.

Next, Numerical Embodiments of the present invention are shown below. In each numerical embodiment, i represents the order of a surface from the object side, ri represents a radius of curvature of an i-th surface from the object side, di represents an interval between the i-th surface and the (i+1)th surface from the object side, and ndi, vdi, and Focal length respectively represent a refractive index of the d-line, an Abbe constant, and a focal length of an optical member between the i-th surface and the (i+1)th surface. BF represents back focus, which refers to an equivalent air distance from a final surface of the glass block P.

The aspherical shape is expressed by the following expression:

$$X = \frac{H^2/R}{1+\sqrt{1-(1+k)(H/R)^2}} + A4H^4 + A6H^6 +$$

$$A8H^8 + A10H^{10} + A12H^{12} + A14H^{14} + A16H^{16}A3H^3 +$$
$$A5H^5 + A7H^7 + A9H^9 + A11H^{11} + A13H^{13} + A15H^{15}$$

where X represents a coordinate in the optical axis direction, H represents a coordinate in a direction perpendicular to the optical axis, a traveling direction of light corresponds to a positive direction, R represents a paraxial radius of curvature, k represents a conic constant, and A4, A6, A8, A10, A12, A14, A16, A3, A5, A7, A9, A11, A13, and A15 represent aspherical coefficients. Further, "e-Z" means "$\times 10^{-Zn}$".

Corresponding values of each conditional expression in this embodiment are shown in Table 1.

Numerical Embodiment 1

| | | Unit mm | | | | |
|---|---|---|---|---|---|---|
| | | Surface data | | | | |
| Surface number | r | d | nd | vd | Focal length | Effective diameter |
| 1 | 1498.521 | 6.00 | 1.72047 | 34.7 | −501.17 | 197.37 |
| 2 | 292.072 | 1.71 | | | | 190.96 |
| 3 | 302.505 | 25.06 | 1.43387 | 95.1 | 492.47 | 190.87 |
| 4 | −715.392 | 26.87 | | | | 190.04 |
| 5 | 263.490 | 24.47 | 1.43387 | 95.1 | 510.12 | 190.11 |
| 6 | −1365.543 | 0.25 | | | | 189.31 |
| 7 | 297.125 | 11.67 | 1.43387 | 95.1 | 1173.57 | 182.23 |
| 8 | 702.497 | 1.20 | | | | 180.73 |
| 9 | 165.793 | 13.41 | 1.43875 | 94.9 | 870.85 | 170.08 |
| 10 | 285.096 | (Variable) | | | | 168.13 |
| 11* | 5956.094 | 2.07 | 1.88300 | 40.8 | −42.53 | 43.35 |
| 12 | 37.530 | 9.94 | | | | 37.36 |
| 13 | −43.593 | 1.60 | 1.88300 | 40.8 | −29.25 | 37.51 |
| 14 | 65.407 | 9.00 | 1.92286 | 18.9 | 38.81 | 42.70 |
| 15 | −75.978 | 0.14 | | | | 43.84 |
| 16 | −100.115 | 1.60 | 1.88300 | 40.8 | −106.25 | 44.23 |
| 17 | 1654.272 | (Variable) | | | | 46.11 |
| 18 | 182.567 | 7.96 | 1.60311 | 60.6 | 118.81 | 48.65 |
| 19 | −116.770 | 0.97 | 1.83400 | 37.2 | −203.83 | 50.18 |
| 20 | −369.230 | (Variable) | | | | 51.37 |
| 21 | 94.045 | 17.27 | 1.60311 | 60.6 | 107.33 | 83.86 |
| 22* | −195.771 | 0.20 | | | | 83.84 |
| 23 | 121.496 | 8.47 | 1.45600 | 90.3 | 369.07 | 81.84 |
| 24 | 424.444 | 0.20 | | | | 80.70 |
| 25 | 119.838 | 2.50 | 1.80515 | 25.5 | −115.99 | 78.65 |
| 26 | 52.265 | 17.57 | 1.45600 | 90.3 | 119.21 | 72.90 |
| 27 | 1137.432 | 0.20 | | | | 72.08 |
| 28* | 188.774 | 7.82 | 1.60311 | 60.6 | 203.90 | 71.27 |
| 29 | −351.220 | (Variable) | | | | 70.33 |
| 30 (Stop) | ∞ | 2.50 | | | | 32.86 |
| 31 | −179.027 | 1.40 | 1.81600 | 46.6 | −42.82 | 31.74 |
| 32 | 43.842 | 0.20 | | | | 30.54 |
| 33 | 35.495 | 4.26 | 1.80809 | 22.8 | 72.65 | 30.69 |
| 34 | 83.621 | 4.53 | | | | 29.97 |
| 35 | −67.959 | 1.40 | 1.88300 | 40.8 | −162.26 | 29.48 |
| 36 | −129.852 | 8.27 | | | | 29.58 |
| 37 | −102.832 | 1.80 | 1.78590 | 44.2 | −48.83 | 28.64 |
| 38 | 62.227 | 3.34 | 1.80515 | 25.5 | 98.10 | 28.91 |
| 39 | 276.838 | 8.33 | | | | 29.02 |
| 40 | 1033.313 | 1.50 | 1.75500 | 52.3 | −95.47 | 30.49 |
| 41 | 67.626 | 7.36 | 1.64769 | 33.8 | 69.89 | 30.78 |
| 42 | −133.867 | 8.65 | | | | 31.37 |
| 43 | 2191.891 | 6.54 | 1.48749 | 70.2 | 89.77 | 31.91 |
| 44 | −44.764 | 1.67 | | | | 32.03 |
| 45 | −49.916 | 1.60 | 1.88300 | 40.8 | −33.09 | 31.31 |
| 46 | 72.548 | 9.47 | 1.48749 | 70.2 | 51.02 | 32.11 |
| 47 | −36.407 | 0.19 | | | | 33.22 |
| 48 | 123.851 | 8.38 | 1.48749 | 70.2 | 60.71 | 33.00 |
| 49 | −38.198 | 1.60 | 1.88300 | 40.8 | −69.77 | 32.58 |
| 50 | −101.541 | 0.15 | | | | 33.00 |
| 51 | 55.491 | 5.78 | 1.51823 | 58.9 | 71.13 | 32.96 |
| 52 | −107.180 | 12.60 | | | | 32.66 |

-continued

| | | Unit mm | | | | |
|---|---|---|---|---|---|---|
| 53 | ∞ | 30.00 | 1.60342 | 38.0 | 0.00 | 60.00 |
| 54 | ∞ | 17.40 | 1.51633 | 64.2 | 0.00 | 60.00 |
| 55 | ∞ | 11.12 | | | | 60.00 |
| Image surface | ∞ | | | | | |

Aspherical surface data

Eleventh surface

K = −2.10664e+004   A4 = 1.06818e−006   A6 = 3.23839e−009   A8 = −1.98505e−010
A10 = −8.76897e−013   A12 = −2.19192e−016
A3 = −1.00075e−006   A5 = −1.11289e−007   A7 = 6.68904e−010   A9 = 1.83658e−011
A11 = 2.16702e−014

Twenty-second surface

K = −2.29771e+000   A4 = 2.33293e−007   A6 = −1.19998e−011   A8 = −6.37543e−015
A10 = −2.29555e−016   A12 = −1.39976e−020
A3 = 4.50116e−007   A5 = 6.28680e−011   A7 = −3.37819e−013   A9 = 5.89095e−015
A11 = 3.15496e−018

Twenty-eight surface

K = 8.38067e−002   A4 = −2.70254e−007   A6 = −1.66112e−010   A8 = 6.01957e−014
A10 = 3.56736e−016   A12 = 1.29490e−019
A3 = 6.30130e−007   A5 = 1.19580e−009   A7 = 1.66949e−013   A9 = −3.36662e−015
A11 = −1.24815e−017

Various data
Zoom ratio 74.00

| | | | | |
|---|---|---|---|---|
| Focal length | 9.60 | 17.17 | 69.06 | 710.40 |
| F number | 1.77 | 1.76 | 1.76 | 3.74 |
| Half angle of field | 29.81 | 17.76 | 4.55 | 0.44 |
| Image height | 5.50 | 5.50 | 5.50 | 5.50 |
| Total lens length | 625.59 | 625.59 | 625.59 | 625.59 |
| BF | 11.12 | 11.12 | 11.12 | 11.12 |
| d10 | 3.99 | 56.62 | 133.82 | 179.43 |
| d17 | 1.04 | 6.29 | 1.30 | 1.07 |
| d20 | 259.37 | 196.91 | 107.22 | 3.34 |
| d29 | 3.00 | 7.58 | 25.06 | 83.56 |
| Entrance pupil position | 133.20 | 254.60 | 811.13 | 7628.04 |
| Exit pupil position | 183.49 | 183.49 | 183.49 | 183.49 |
| Front principal point position | 143.33 | 273.48 | 907.85 | 11266.29 |
| Rear principal point position | 1.52 | −6.05 | −57.93 | −699.28 |

Imaging magnification of each lens unit

| | Zoom Ratio | | | |
|---|---|---|---|---|
| | 1.00 | 1.79 | 7.19 | 74.00 |
| β1 | 0 | 0 | 0 | 0 |
| β2 | −0.1197 | −0.1649 | −0.3691 | −1.3774 |
| β3 | 1.1665 | 1.1979 | 1.1965 | 1.3270 |
| β4 | −0.2597 | −0.3285 | −0.5908 | −1.4685 |
| β5 | 1.0626 | 1.0626 | 1.0626 | 1.0626 |

Zoom lens unit data

| Unit | Leading surface | Focal length | Lens structure length | Front principal point position | Rear principal point position |
|---|---|---|---|---|---|
| 1 | 1 | 249.09 | 110.63 | 58.88 | −25.44 |
| 2 | 11 | −23.00 | 24.34 | 4.52 | −12.35 |
| 3 | 18 | 279.25 | 8.93 | 0.71 | −4.79 |
| 4 | 21 | 66.65 | 54.23 | 12.60 | −25.85 |
| 5 | 30 | 43.03 | 148.94 | 57.65 | 13.82 |

Numerical Embodiment 2

| | | | Unit mm | | | |
|---|---|---|---|---|---|---|
| | | | Surface data | | | |
| Surface number | r | d | nd | vd | Focal length | Effective diameter |
| 1 | 2112.700 | 6.00 | 1.72047 | 34.7 | −499.25 | 196.92 |
| 2 | 308.786 | 1.47 | | | | 191.08 |
| 3 | 309.454 | 23.53 | 1.43387 | 95.1 | 531.33 | 191.02 |
| 4 | −891.785 | 27.04 | | | | 190.44 |
| 5 | 348.300 | 22.90 | 1.43387 | 95.1 | 553.72 | 191.76 |
| 6 | −765.127 | 0.25 | | | | 191.24 |
| 7 | 218.928 | 15.64 | 1.43387 | 95.1 | 823.80 | 182.49 |
| 8 | 550.590 | 1.20 | | | | 180.88 |
| 9 | 173.017 | 12.78 | 1.43875 | 94.9 | 931.61 | 171.34 |
| 10 | 292.697 | (Variable) | | | | 169.41 |
| 11* | 731.735 | 2.20 | 1.88300 | 40.8 | −45.02 | 43.98 |
| 12 | 37.858 | 10.15 | | | | 37.81 |
| 13 | −43.564 | 1.70 | 1.88300 | 40.8 | −29.43 | 37.55 |
| 14 | 66.527 | 8.47 | 1.92286 | 18.9 | 41.71 | 42.45 |
| 15 | −88.285 | 0.14 | | | | 43.55 |
| 16 | −100.000 | 1.70 | 1.88300 | 40.8 | −145.44 | 43.76 |
| 17 | −446.301 | (Variable) | | | | 45.38 |
| 18 | 238.657 | 5.27 | 1.43875 | 94.9 | 491.45 | 47.03 |
| 19 | −2278.362 | (Variable) | | | | 48.89 |
| 20 | 97.139 | 17.36 | 1.60311 | 60.6 | 105.01 | 83.36 |
| 21* | −171.641 | 0.20 | | | | 83.41 |
| 22 | 106.725 | 8.44 | 1.45600 | 90.3 | 369.85 | 81.10 |
| 23 | 282.160 | 0.20 | | | | 79.86 |
| 24 | 126.885 | 2.50 | 1.80515 | 25.5 | −115.88 | 78.36 |
| 25 | 53.574 | 18.09 | 1.45600 | 90.3 | 113.51 | 72.83 |
| 26 | −1484.357 | 0.20 | | | | 72.03 |
| 27* | 213.337 | 7.03 | 1.60311 | 60.6 | 242.94 | 70.84 |
| 28 | −467.865 | (Variable) | | | | 69.83 |
| 29 (Stop) | ∞ | 2.50 | | | | 32.80 |
| 30 | −180.551 | 1.40 | 1.81600 | 46.6 | −43.06 | 31.68 |
| 31 | 44.060 | 0.20 | | | | 30.49 |
| 32 | 35.616 | 4.90 | 1.80809 | 22.8 | 73.57 | 30.63 |
| 33 | 82.093 | 4.04 | | | | 29.69 |
| 34 | −67.450 | 1.40 | 1.88300 | 40.8 | −163.54 | 29.35 |
| 35 | −127.155 | 8.85 | | | | 29.45 |
| 36 | −106.567 | 1.80 | 1.75500 | 52.3 | −43.82 | 28.44 |
| 37 | 48.646 | 4.23 | 1.80515 | 25.5 | 76.28 | 28.68 |
| 38 | 217.260 | 3.03 | | | | 28.76 |
| 39 | ∞ | 13.78 | 1.64769 | 33.8 | 256.23 | 29.18 |
| 40 | −167.121 | 5.68 | | | | 30.47 |
| 41 | 433.990 | 6.23 | 1.48749 | 70.2 | 73.74 | 30.76 |
| 42 | −39.153 | 1.95 | | | | 30.77 |
| 43 | −41.105 | 1.60 | 1.88300 | 40.8 | −28.44 | 29.76 |
| 44 | 66.713 | 8.82 | 1.51633 | 64.1 | 46.35 | 30.66 |
| 45 | −35.846 | 0.19 | | | | 31.67 |
| 46 | 181.290 | 8.79 | 1.48749 | 70.2 | 58.65 | 31.50 |
| 47 | −33.539 | 1.60 | 1.88300 | 40.8 | −68.12 | 31.14 |
| 48 | −76.945 | 0.15 | | | | 31.73 |
| 49 | 63.511 | 8.07 | 1.51823 | 58.9 | 68.41 | 31.58 |
| 50 | −77.467 | 1.50 | | | | 31.11 |
| 51 | ∞ | 1.50 | 1.64000 | 60.1 | −57.42 | 29.93 |
| 52 | 36.893 | 4.00 | 1.80518 | 25.4 | 11485.99 | 28.91 |
| 53 | 35.239 | 6.00 | 1.64000 | 60.1 | 54.63 | 27.79 |
| 54 | −8438.932 | 1.00 | | | | 27.07 |
| 55 | ∞ | 30.00 | 1.60342 | 38.0 | 0.00 | 60.00 |
| 56 | ∞ | 17.40 | 1.51633 | 64.2 | 0.00 | 60.00 |
| 57 | ∞ | 11.00 | | | | 60.00 |
| Image surface | ∞ | | | | | |

Aspherical surface data

Eleventh surface

K = 8.03406e+002    A4 = 6.74072e−007    A6 = 6.23931e−003    A8 = −1.27621e−010
A10 = −4.94210e−013    A12 = −1.12990e−016
A3 = −6.56185e−007    A5 = −8.66546e−008    A7 = 4.35521e−010    A9 = 1.10404e−011
A11 = 1.15600e−014

-continued

Twenty-first surface

K = −4.80567e+000  A4 = 2.01287e−007  A6 = −3.86623e−011  A8 = −2.62839e−015
A10 = −2.30016e−016  A12 = −1.41453e−020
A3 = 3.96617e−007  A5 = −3.34506e−010  A7 = −4.67420e−013  A9 = 5.90395e−015
A11 = 3.15544e−018

Twenty-seventh surface

K = 1.06499e+001  A4 = −3.28034e−007  A6 = −1.69153e−010  A8 = 3.30566e−014
A10 = 3.59407e−016  A12 = 1.25732e−019
A3 = 5.77926e−007  A5 = 6.57458e−010  A7 = −1.94822e−013  A9 = −2.48248e−015
A11 = −1.25402e−017

Various data
Zoom ratio 74.00

| | | | | |
|---|---|---|---|---|
| Focal length | 9.60 | 17.35 | 68.27 | 710.40 |
| F number | 1.77 | 1.76 | 1.76 | 3.74 |
| Half angle of field | 29.81 | 17.59 | 4.61 | 0.44 |
| Image height | 5.50 | 5.50 | 5.50 | 5.50 |
| Total lens length | 627.26 | 627.26 | 627.26 | 627.26 |
| BF | 11.00 | 11.00 | 11.00 | 11.00 |
| d10 | 4.74 | 57.37 | 134.56 | 180.18 |
| d17 | 0.08 | 25.10 | 11.11 | 0.11 |
| d19 | 263.37 | 181.67 | 101.83 | 7.35 |
| d28 | 3.00 | 7.05 | 23.69 | 83.55 |
| Entrance pupil position | 134.41 | 255.46 | 809.91 | 7641.42 |
| Exit pupil position | 228.45 | 228.45 | 228.45 | 228.45 |
| Front principal point position | 144.44 | 274.20 | 899.62 | 10672.70 |
| Rear principal point position | 1.40 | −6.35 | −57.27 | −699.40 |

Imaging magnification of each lens unit

| | Zoom Ratio | | | |
|---|---|---|---|---|
| | 1.00 | 1.81 | 7.11 | 74.00 |
| β1 | 0 | 0 | 0 | 0 |
| β2 | −0.1281 | −0.1767 | −0.3987 | −1.5474 |
| β3 | 1.0901 | 1.1574 | 1.1346 | 1.1813 |
| β4 | −0.2597 | −0.3205 | −0.5702 | −1.4683 |
| β5 | 1.0626 | 1.0626 | 1.0626 | 1.0626 |

Zoom lens unit data

| Unit | Leading surface | Focal length | Lens structure length | Front principal point position | Rear principal point position |
|---|---|---|---|---|---|
| 1 | 1 | 249.09 | 110.82 | 60.09 | −24.02 |
| 2 | 11 | −24.50 | 24.36 | 4.57 | −12.57 |
| 3 | 18 | 491.45 | 5.27 | 0.35 | −3.31 |
| 4 | 20 | 66.65 | 54.02 | 12.26 | −25.93 |
| 5 | 29 | 45.48 | 150.61 | 57.71 | 13.84 |

Numerical Embodiment 3

Unit mm

Surface data

| Surface number | r | d | nd | vd | Focal length | Effective diameter |
|---|---|---|---|---|---|---|
| 1 | 601.710 | 18.63 | 1.49700 | 81.5 | 644.22 | 204.01 |
| 2 | −681.514 | 1.09 | | | | 202.66 |
| 3 | −757.946 | 5.00 | 1.83481 | 42.7 | −293.90 | 200.34 |
| 4 | 366.888 | 3.61 | | | | 196.83 |
| 5 | 387.822 | 23.63 | 1.43387 | 95.1 | 586.08 | 198.02 |
| 6 | −730.150 | 19.99 | | | | 198.43 |
| 7 | 323.116 | 22.65 | 1.43387 | 95.1 | 644.34 | 199.64 |
| 8 | −2068.334 | 0.25 | | | | 198.86 |
| 9 | 258.092 | 19.76 | 1.43387 | 95.1 | 663.88 | 192.85 |
| 10 | 2373.511 | 0.25 | | | | 191.19 |
| 11 | 171.734 | 14.21 | 1.49700 | 81.5 | 780.42 | 177.10 |
| 12 | 299.011 | (Variable) | | | | 174.93 |
| 13 | 205.037 | 1.85 | 1.81600 | 46.6 | −84.05 | 52.06 |
| 14 | 51.382 | 8.19 | | | | 46.05 |
| 15 | −199.814 | 1.76 | 1.76500 | 52.3 | −123.15 | 44.37 |
| 16 | 176.048 | 5.63 | | | | 42.56 |
| 17 | −69.165 | 1.76 | 1.81600 | 46.6 | −49.77 | 42.62 |
| 18 | 100.741 | 7.85 | 1.92286 | 21.3 | 44.23 | 45.10 |
| 19 | −67.278 | 0.78 | | | | 45.47 |
| 20 | −67.542 | 2.04 | 1.88300 | 40.8 | −57.35 | 45.36 |
| 21 | 210.073 | (Variable) | | | | 47.26 |
| 22 | 310.699 | 2.73 | 1.77250 | 49.6 | 522.50 | 48.19 |
| 23 | 1323.130 | (Variable) | | | | 48.85 |
| 24 | 483.432 | 8.60 | 1.59240 | 68.3 | 172.27 | 68.16 |
| 25 | −129.075 | 0.20 | | | | 69.04 |
| 26 | 211.548 | 11.12 | 1.48749 | 70.2 | 174.24 | 70.58 |
| 27 | −140.273 | 2.38 | | | | 70.65 |

-continued

Unit mm

| | | | | | |
|---|---|---|---|---|---|
| 28 | −101.177 | 2.50 | 1.72047 34.7 | −681.79 | 70.52 |
| 29 | −128.521 | 0.20 | | | 71.21 |
| 30 | 110.493 | 3.07 | 1.84666 23.9 | −177.53 | 70.05 |
| 31 | 63.127 | 0.12 | | | 67.47 |
| 32 | 61.503 | 15.77 | 1.49700 81.5 | 116.25 | 67.68 |
| 33 | −916.634 | 0.20 | | | 66.79 |
| 34 | 138.855 | 8.37 | 1.48749 70.2 | 328.25 | 65.36 |
| 35 | 1006.675 | (Variable) | | | 63.53 |
| 36 (Stop) | ∞ | 4.50 | | | 30.23 |
| 37 | −68.512 | 1.80 | 1.81600 46.6 | −37.69 | 28.68 |
| 38 | 57.005 | 0.20 | | | 28.30 |
| 39 | 35.952 | 6.11 | 1.80809 22.8 | 55.31 | 28.71 |
| 40 | 162.931 | 5.06 | | | 27.84 |
| 41 | −53.106 | 2.00 | 1.88300 40.8 | −36.18 | 27.07 |
| 42 | 82.782 | 21.49 | 1.80518 25.4 | 94.61 | 27.57 |
| 43 | −953.879 | 4.85 | | | 29.98 |
| 44 | 5505.229 | 6.77 | 1.62041 60.3 | 114.30 | 30.94 |
| 45 | −72.095 | 0.20 | | | 31.51 |
| 46 | −372.556 | 2.10 | 1.83400 37.2 | −48.47 | 31.37 |
| 47 | 45.784 | 7.60 | 1.62041 60.3 | 37.87 | 31.31 |
| 48 | −45.562 | 0.20 | | | 31.48 |
| 49 | 113.998 | 6.99 | 1.48749 70.2 | 58.33 | 30.15 |
| 50 | −37.292 | 2.10 | 1.83400 37.2 | −64.33 | 29.26 |
| 51 | −123.641 | 0.20 | | | 29.38 |
| 52 | 117.711 | 3.26 | 1.62041 60.3 | 135.50 | 29.09 |
| 53 | −295.058 | 2.00 | | | 28.72 |
| 54 | ∞ | 55.50 | 1.51633 64.2 | 0.00 | 27.85 |
| 55 | ∞ | 9.56 | | | 14.51 |
| Image surface | ∞ | | | | |

Various Data
Zoom ratio 66.00

| | | | | |
|---|---|---|---|---|
| Focal length | 9.80 | 1.50 | 65.35 | 646.80 |
| F number | 1.80 | 1.80 | 1.80 | 3.25 |
| Half angle of field | 29.30 | 22.17 | 4.81 | 0.49 |
| Image height | 5.50 | 5.50 | 5.50 | 5.50 |
| Total lens length | 606.59 | 606.59 | 606.59 | 606.59 |
| BF | 9.56 | 9.56 | 9.56 | 9.56 |
| d12 | 2.61 | 30.97 | 117.61 | 160.16 |
| d21 | 1.60 | 3.85 | 1.64 | 1.60 |
| d23 | 243.58 | 210.20 | 105.47 | 1.22 |
| d35 | 2.14 | 4.91 | 25.22 | 86.96 |
| Entrance pupil position | 155.42 | 218.01 | 787.24 | 7283.11 |
| Exit pupil position | −1013.49 | −1013.49 | −1013.49 | −1013.49 |
| Front principal point position | 165.13 | 231.33 | 848.42 | 7520.98 |
| Rear principal point position | −0.24 | −3.94 | −56.79 | −637.24 |

Imaging magnification of each lens unit

Zoom Ratio

| | 1.00 | 1.38 | 6.67 | 66.00 |
|---|---|---|---|---|
| β1 | 0 | 0 | 0 | 0 |
| β2 | −0.1474 | −0.1764 | −0.4400 | −1.6555 |
| β3 | 1.0869 | 1.0937 | 1.1041 | 1.1814 |
| β4 | −0.2851 | −0.3262 | −0.6270 | −1.5416 |
| β5 | 0.9047 | 0.9047 | 0.9047 | 0.9047 |

Zoom lens unit data

| Unit | Leading surface | Focal length | Lens structure length | Front principal point position | Rear principal point position |
|---|---|---|---|---|---|
| 1 | 1 | 237.11 | 129.06 | 69.10 | −26.56 |
| 2 | 13 | −25.50 | 29.86 | 3.49 | −11.37 |
| 3 | 22 | 522.50 | 2.73 | −0.47 | −2.01 |
| 4 | 24 | 67.50 | 52.53 | 13.29 | −23.50 |
| 5 | 36 | 58.13 | 132.92 | 54.88 | 4.02 |

Numerical Embodiment 4

Unit mm
Surface data

| Surface number | r | d | nd | vd | Focal length | Effective diameter |
|---|---|---|---|---|---|---|
| 1 | 615.180 | 11.01 | 1.43387 | 95.1 | 1304.17 | 199.02 |
| 2 | −7243.094 | 1.00 | | | | 198.80 |
| 3 | −23330.131 | 5.00 | 1.90366 | 31.3 | −565.36 | 198.57 |
| 4 | 526.419 | 3.80 | | | | 197.45 |
| 5 | 817.499 | 15.85 | 1.43387 | 95.1 | 908.96 | 197.54 |
| 6 | −761.139 | 18.75 | | | | 197.77 |
| 7 | 385.753 | 18.12 | 1.43387 | 95.1 | 750.14 | 197.09 |
| 8 | −2086.260 | 0.25 | | | | 196.58 |
| 9 | 233.992 | 18.08 | 1.43387 | 95.1 | 713.34 | 190.00 |
| 10 | 929.470 | 0.25 | | | | 188.74 |
| 11 | 162.844 | 17.31 | 1.43387 | 95.1 | 700.51 | 176.28 |
| 12 | 338.518 | (Variable) | | | | 174.11 |
| 13 | 378.473 | 1.45 | 1.88300 | 40.8 | −57.09 | 47.27 |
| 14 | 44.631 | 4.99 | | | | 41.77 |
| 15 | 255.924 | 1.38 | 1.88300 | 40.8 | −171.11 | 41.25 |
| 16 | 95.198 | 6.49 | | | | 40.67 |
| 17 | −60.966 | 1.38 | 1.81600 | 46.6 | −44.26 | 40.82 |
| 18 | 90.624 | 6.13 | 1.95906 | 17.5 | 54.20 | 44.03 |
| 19 | −121.614 | 1.70 | | | | 44.50 |
| 20 | −85.522 | 1.60 | 1.81600 | 46.6 | −64.71 | 44.75 |
| 21 | 141.042 | (Variable) | | | | 47.50 |
| 22 | 139.576 | 6.25 | 1.62041 | 60.3 | 119.17 | 48.91 |
| 23 | −155.801 | (Variable) | | | | 49.98 |
| 24 | 596.624 | 9.01 | 1.59240 | 68.3 | 157.53 | 70.42 |
| 25 | −110.455 | 0.20 | | | | 71.12 |
| 26 | 164.319 | 11.81 | 1.49700 | 81.5 | 148.91 | 72.55 |
| 27 | −132.141 | 1.77 | | | | 72.40 |
| 28 | −107.290 | 2.50 | 1.72047 | 34.7 | −515.13 | 72.18 |
| 29 | −151.977 | 0.20 | | | | 72.56 |
| 30 | 89.942 | 2.50 | 1.84666 | 23.9 | −186.56 | 70.11 |
| 31 | 56.775 | 0.12 | | | | 66.98 |
| 32 | 55.595 | 11.77 | 1.49700 | 81.5 | 136.61 | 67.12 |
| 33 | 281.579 | 0.20 | | | | 66.38 |
| 34 | 140.356 | 5.45 | 1.48749 | 70.2 | 386.72 | 65.66 |
| 35 | 537.023 | (Variable) | | | | 64.68 |
| 36 (Stop) | ∞ | 4.50 | | | | 31.35 |
| 37 | −72.957 | 1.80 | 1.81600 | 46.6 | −41.54 | 29.81 |
| 38 | 64.621 | 0.20 | | | | 29.40 |
| 39 | 34.831 | 7.62 | 1.80809 | 22.8 | 62.71 | 29.85 |
| 40 | 98.231 | 6.09 | | | | 28.31 |
| 41 | −48.924 | 2.00 | 1.88300 | 40.8 | −35.29 | 27.40 |
| 42 | 88.891 | 14.26 | 1.84666 | 23.8 | 90.04 | 28.03 |
| 43 | −532.333 | 4.55 | | | | 29.73 |
| 44 | 521.296 | 6.95 | 1.48749 | 70.2 | 129.83 | 30.72 |
| 45 | −71.997 | 0.20 | | | | 31.28 |
| 46 | −361.104 | 2.10 | 1.83400 | 37.2 | −43.85 | 31.20 |
| 47 | 41.094 | 11.41 | 1.60311 | 60.6 | 36.10 | 31.27 |
| 48 | −41.792 | 0.20 | | | | 31.97 |
| 49 | 110.655 | 8.37 | 1.48749 | 70.2 | 59.60 | 30.67 |
| 50 | −38.599 | 2.10 | 1.83400 | 37.2 | −80.48 | 29.41 |
| 51 | −92.295 | 0.20 | | | | 29.15 |
| 52 | 60.291 | 2.96 | 1.60311 | 60.6 | 174.97 | 28.38 |
| 53 | 137.326 | 2.00 | | | | 27.79 |
| 54 | ∞ | 55.50 | 1.51633 | 64.2 | 0.00 | 27.33 |
| 55 | ∞ | 9.56 | | | | 14.40 |
| Image surface | ∞ | | | | | |

Various data
Zoom ratio 66.00

| | | | | |
|---|---|---|---|---|
| Focal length | 9.80 | 13.41 | 65.33 | 646.80 |
| F number | 1.80 | 1.79 | 1.79 | 3.25 |
| Half angle of field | 29.30 | 22.30 | 4.81 | 0.49 |
| Image height | 5.50 | 5.50 | 5.50 | 5.50 |
| Total lens length | 579.47 | 579.47 | 579.47 | 579.47 |
| BF | 9.56 | 9.56 | 9.56 | 9.56 |
| d12 | 3.89 | 30.67 | 118.89 | 161.43 |
| d21 | 0.95 | 3.33 | 0.99 | 0.95 |

-continued

Unit mm

| | | | | |
|---|---|---|---|---|
| d23 | 243.36 | 211.85 | 105.27 | 1.00 |
| d35 | 2.36 | 4.71 | 25.42 | 87.18 |
| Entrance pupil position | 139.48 | 197.96 | 768.43 | 6980.80 |
| Exit pupil position | −1006.33 | −1006.33 | −1006.33 | −1006.33 |
| Front principal point position | 149.19 | 211.19 | 829.56 | 7215.79 |
| Rear principal point position | −0.24 | −3.85 | −55.77 | −637.24 |

Imaging magnification of each lens unit

Zoom Ratio

| | 1.00 | 1.37 | 6.67 | 66.00 |
|---|---|---|---|---|
| β1 | 0 | 0 | 0 | 0 |
| β2 | −0.1135 | −0.1338 | −0.3267 | −1.0709 |

-continued

Unit mm

| | | | | |
|---|---|---|---|---|
| β3 | 1.4120 | 1.4601 | 1.4878 | 1.8263 |
| β4 | −0.2851 | −0.3199 | −0.6267 | −1.5416 |
| β5 | 0.9047 | 0.9047 | 0.9047 | 0.9047 |

Zoom lens unit data

| Unit | Leading surface | Focal length | Lens structure length | Front principal point position | Rear principal point position |
|---|---|---|---|---|---|
| 1 | 1 | 237.11 | 109.41 | 53.23 | −29.36 |
| 2 | 13 | −20.00 | 25.14 | 7.64 | −9.71 |
| 3 | 22 | 119.17 | 6.25 | 1.84 | −2.05 |
| 4 | 24 | 67.50 | 45.54 | 9.77 | −21.11 |
| 5 | 36 | 60.32 | 133.01 | 56.92 | 3.81 |

Numerical Embodiment 5

Unit mm

Surface data

| Surface number | r | d | nd | vd | Focal length | Effective diameter |
|---|---|---|---|---|---|---|
| 1 | 10287.031 | 6.00 | 1.83400 | 37.2 | −449.70 | 203.98 |
| 2 | 363.989 | 1.64 | | | | 199.81 |
| 3 | 356.050 | 27.97 | 1.43387 | 95.1 | 492.28 | 200.86 |
| 4 | −524.372 | 27.91 | | | | 201.40 |
| 5 | 340.081 | 19.34 | 1.43387 | 95.1 | 753.70 | 203.53 |
| 6 | −8941.232 | 0.25 | | | | 203.02 |
| 7 | 254.448 | 20.37 | 1.43387 | 95.1 | 679.75 | 197.97 |
| 8 | 1781.038 | 1.20 | | | | 196.70 |
| 9 | 198.707 | 12.48 | 1.49700 | 81.5 | 979.57 | 184.79 |
| 10 | 328.063 | (Variable) | | | | 182.87 |
| 11* | 12587.416 | 2.20 | 2.00330 | 28.3 | −56.89 | 46.68 |
| 12 | 57.292 | 7.36 | | | | 41.64 |
| 13 | −69.182 | 1.40 | 1.83400 | 37.2 | −37.81 | 41.37 |
| 14 | 59.184 | 9.46 | 1.95906 | 17.5 | 31.78 | 40.08 |
| 15 | −59.508 | 1.20 | | | | 39.58 |
| 16 | −50.567 | 1.60 | 1.88300 | 40.8 | −33.49 | 38.35 |
| 17 | 73.286 | (Variable) | | | | 37.04 |
| 18 | 91.796 | 6.57 | 1.48749 | 70.2 | 80.60 | 37.44 |
| 19 | −67.478 | 0.50 | | | | 37.35 |
| 20 | −57.184 | 1.60 | 1.81600 | 46.6 | −122.47 | 37.36 |
| 21 | −134.443 | (Variable) | | | | 37.78 |
| 22* | 195.782 | 8.44 | 1.59522 | 67.7 | 138.83 | 62.90 |
| 23* | −141.545 | 0.50 | | | | 63.32 |
| 24 | 136.580 | 7.34 | 1.59522 | 67.7 | 197.19 | 63.49 |
| 25 | −838.778 | 0.20 | | | | 63.00 |
| 26 | 359.797 | 2.50 | 1.84666 | 23.8 | −223.73 | 62.34 |
| 27 | 124.496 | 4.16 | 1.43875 | 94.9 | 1854.51 | 61.12 |
| 28 | 145.418 | (Variable) | | | | 60.51 |
| 29 | 101.637 | 2.50 | 1.84666 | 23.8 | −287.73 | 60.28 |
| 30 | 71.108 | 11.26 | 1.59522 | 67.7 | 85.28 | 58.91 |
| 31* | −168.956 | (Variable) | | | | 58.34 |
| 32 (Stop) | ∞ | 3.25 | | | | 29.56 |
| 33 | −84.065 | 2.00 | 1.81600 | 46.6 | −22.77 | 28.41 |
| 34 | 24.271 | 10.02 | 1.84666 | 23.8 | 28.62 | 27.39 |
| 35 | 2352.129 | 5.77 | | | | 26.46 |
| 36 | −36.619 | 2.00 | 1.88300 | 40.8 | −20.82 | 25.46 |
| 37 | 38.303 | 6.40 | 1.62041 | 60.3 | 45.54 | 26.80 |
| 38 | −102.275 | 5.81 | | | | 27.91 |
| 39 | −133.691 | 6.23 | 1.58913 | 61.1 | 63.19 | 30.41 |
| 40 | −29.712 | 10.00 | | | | 31.34 |
| 41 | −662.447 | 2.00 | 1.88300 | 40.8 | −27.82 | 29.06 |
| 42 | 25.703 | 9.65 | 1.51823 | 58.9 | 32.47 | 28.65 |
| 43 | −42.983 | 2.65 | | | | 29.35 |
| 44 | 120.892 | 8.10 | 1.48749 | 70.2 | 46.03 | 29.48 |
| 45 | −27.058 | 2.00 | 1.88300 | 40.8 | −42.21 | 29.29 |
| 46 | −100.615 | 3.54 | | | | 30.39 |
| 47 | 826.257 | 6.26 | 1.54814 | 45.8 | 55.45 | 31.04 |
| 48 | −31.639 | 10.00 | | | | 31.18 |
| 49 | ∞ | 33.00 | 1.60859 | 46.4 | 0.00 | 60.00 |

-continued

| Unit mm | | | | | | |
|---|---|---|---|---|---|---|
| 50 | ∞ | 13.20 | 1.51633 | 64.2 | 0.00 | 60.00 |
| 51 | ∞ | 11.45 | | | | 60.00 |
| Image surface | ∞ | | | | | |

Aspherical surface data

Eleventh surface

K = −1.40193e+006  A4 = 1.21651e−006  A6 = 3.38392e−010  A8 = 4.70002e−013

Twenty-first surface

K = 5.99583e−001  A4 = 1.87674e−007  A6 = 2.11142e−013  A8 = 1.36861e−016

Thirty-first surface

K = 1.18800e+001  A4 = 5.96100e−007  A6 = 3.17472e−011  A8 = 5.61619e−014

Various data
Zoom ratio 99.99

| | | | | |
|---|---|---|---|---|
| Focal length | 9.00 | 14.01 | 82.92 | 899.92 |
| F number | 1.80 | 1.80 | 1.80 | 4.50 |
| Half angle of field | 31.43 | 21.44 | 3.79 | 0.35 |
| Image height | 5.50 | 5.50 | 5.50 | 5.50 |
| Total lens length | 644.77 | 644.77 | 644.77 | 644.77 |
| BF | 11.45 | 11.45 | 11.45 | 11.45 |
| d10 | 2.97 | 45.70 | 157.60 | 206.44 |
| d17 | 3.18 | 8.60 | 6.74 | 0.50 |
| d21 | 260.34 | 206.94 | 86.75 | 1.43 |
| d28 | 35.98 | 36.78 | 15.42 | 11.31 |
| d31 | 3.00 | 7.45 | 38.95 | 85.75 |
| Entrance pupil position | 133.11 | 216.04 | 1007.93 | 13356.79 |
| Exit pupil position | 182.64 | 182.64 | 182.64 | 182.64 |
| Front principal point position | 142.58 | 231.19 | 1131.01 | 18987.27 |
| Rear principal point position | 2.45 | −2.56 | −71.47 | −888.47 |

Imaging magnification of each lens unit

| | Zoom Ratio | | | |
|---|---|---|---|---|
| | 1.00 | 1.56 | 9.21 | 99.99 |
| β1 | 0 | 0 | 0 | 0 |
| β2 | −0.0995 | −0.1241 | −0.3502 | −1.7107 |
| β3 | 1.1719 | 1.2090 | 1.2288 | 1.4141 |
| β4 | −0.6050 | −0.7924 | −3.8956 | 7.1801 |
| β5 | 0.4818 | 0.4452 | 0.1869 | −0.1971 |
| β6 | 0.9862 | 0.9862 | 0.9862 | 0.9862 |

Zoom lens unit data

| Unit | Leading surface | Focal length | Lens structure length | Front principal point position | Rear principal point position |
|---|---|---|---|---|---|
| 1 | 1 | 268.44 | 117.18 | 66.49 | −20.59 |
| 2 | 11 | −21.50 | 23.22 | 7.35 | −7.00 |
| 3 | 18 | 226.37 | 8.66 | −0.63 | −6.41 |
| 4 | 22 | 115.10 | 23.14 | −0.31 | −14.62 |
| 5 | 29 | 121.89 | 13.76 | 3.04 | −5.53 |
| 6 | 32 | 41.12 | 141.88 | 54.06 | 10.88 |

TABLE 1

| | Conditional expression | Embodiment | | | | |
|---|---|---|---|---|---|---|
| | | 1 | 2 | 3 | 4 | 5 |
| (1) | L2fm/L2W | 6.07 | 295.58 | 2.41 | 3.50 | 2.70 |
| (2) | f3/f2 | −12.14 | −20.06 | −20.49 | −5.96 | −10.53 |
| (3) | f1/f23W | −9.39 | −9.39 | −8.62 | −8.62 | −10.77 |
| (4) | (L1W − L1fm)/f23wm | −1.94 | −1.88 | −1.03 | −0.95 | −1.67 |

TABLE 1-continued

| Conditional expression | Embodiment | | | | |
|---|---|---|---|---|---|
| | 1 | 2 | 3 | 4 | 5 |
| (5) Nd | — | 1.43875 | 1.77250 | 1.62041 | — |
| (6) νd | — | 94.9 | 49.6 | 60.3 | — |
| (7) Ndp − Ndn | −0.23 | — | — | — | −0.33 |
| (8) νdp − νdn | 23.5 | — | — | — | 23.6 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-010124, filed Jan. 23, 2013, which is hereby incorporated by reference herein in its entirety.

What is claimed is:

1. A zoom lens, comprising, in order from an object side to an image side:
   a first lens unit having a positive refractive power, which does not move for zooming;
   a second lens unit having a negative refractive power, which moves during zooming;
   a third lens unit having a positive refractive power, which moves during zooming;
   at least one lens unit having a positive refractive power, which moves during zooming; and
   a last lens unit having a positive refractive power, which does not move for zooming,
   wherein, when a focal length fm at an intermediate zoom position is expressed by $fm=fw \times (Z)^{1/2}$ where fw represents a focal length of the zoom lens at a wide angle end, and Z represents a zoom ratio, the following conditional expressions are satisfied:

$1.5 < L2fm/L2W < 500$;

$-30 < f3/f2 < -3$; and $-15 < f1/f23W < -8$, where L2W represents an interval between the second lens unit and the third lens unit at the wide angle end, L2fm represents an interval between the second lens unit and the third lens unit at a zoom position at which an offaxial principal ray having a largest image height is farthest from an optical axis on a lens surface disposed on a most object side in the first lens unit in a zoom range from the wide angle end to the focal length fm, f1 represents a focal length of the first lens unit, f2 represents a focal length of the second lens unit, f3 represents a focal length of the third lens unit, and f23W represents a combined focal length of the second lens unit and the third lens unit at the wide angle end.

2. The zoom lens according to claim 1, wherein the at least one lens unit comprises:
   a fourth lens unit having a positive refractive power, which moves during zooming; and
   a fifth lens unit having a positive refractive power, which moves during zooming.

3. The zoom lens according to claim 1, wherein the following conditional expression is satisfied:

$-2.2 < (L1fm-L1W)/f23wm < -0.5$, where L1W represents an interval between the first lens unit and the second lens unit at the wide angle end, f23wm represents a combined focal length of the second lens unit and the third lens unit at the zoom position at which the offaxial principal ray having the largest image height is farthest from the optical axis on a lens surface disposed on the most object side in the first lens unit in the zoom range from the wide angle end to the focal length fm, and L1fm represents an interval between the first lens unit and the second lens unit at the zoom position.

4. The zoom lens according to claim 1, wherein the third lens unit is composed of a single convex lens, and the following conditional expressions are satisfied:

$1.40 < Nd < 1.85$; and $40 < vd < 96$, where Nd represents a refractive index of the single convex lens on a d-line, and νd represents an Abbe constant of the single convex lens on the d-line.

5. The zoom lens according to claim 1, wherein the third lens unit comprises at least one convex lens and at least one concave lens, and the following conditional expressions are satisfied:

$-0.43 < Ndp-Ndn < -0.1$; and $10 < vdp-vdn < 40$, where Ndp represents an average value of a refractive index on a d-line of the at least one convex lens, Ndn represents an average value of a refractive index on the d-line of the at least one concave lens, vdp represents an average value of an Abbe constant on the d-line of the at least one convex lens, and vdn represents an average value of an Abbe constant on the d-line of the at least one concave lens.

6. An image pickup apparatus, comprising:
   a zoom lens, comprising, in order from an object side to an image side:
      a first lens unit having a positive refractive power, which does not move for zooming;
      a second lens unit having a negative refractive power, which moves during zooming;
      a third lens unit having a positive refractive power, which moves during zooming;
      at least one lens unit having a positive refractive power, which moves during zooming; and
   a last lens unit having a positive refractive power, which does not move for zooming,
   wherein, when a focal length fm at an intermediate zoom position is expressed by $fm=fw \times (Z)^{1/2}$ where fw represents a focal length of the zoom lens at a wide angle end, and Z represents a zoom ratio, the following conditional expressions are satisfied:

$1.5 < L2fm/L2W < 500$;

$-30 < f3/f2 < -3$; and $-15 < f1/f23W < -8$, where L2W represents an interval between the second lens unit and the third lens unit at the wide angle end, L2fm represents an interval between the second lens unit and the third lens unit at a zoom position at which an offaxial principal ray having a largest image height is farthest from an optical axis on a lens surface disposed on a most object side in the first lens unit in a zoom range from the wide angle end to the focal length fm, f1 represents a focal length of the first lens unit, f2 represents a focal length of the second lens unit, f3 represents a focal length of the third lens unit, and f23W represents a combined focal length of the second lens unit and the third lens unit at the wide angle end; and a solid-state image pickup element for receiving light of an image formed by the zoom lens.

* * * * *